United States Patent
Ko et al.

(10) Patent No.: US 9,532,254 B2
(45) Date of Patent: Dec. 27, 2016

(54) METHOD AND DEVICE FOR PERFORMING CHANNEL MEASUREMENT BY USING CSI-REFERENCE SIGNAL CORRESPONDING TO RECEIVED CHANNEL MEASUREMENT TARGET

(75) Inventors: Hyunsoo Ko, Anyang-si (KR); Binchul Ihm, Anyang-si (KR); Jaehoon Chung, Anyang-si (KR); Jiwon Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 498 days.

(21) Appl. No.: 14/115,502

(22) PCT Filed: May 4, 2012

(86) PCT No.: PCT/KR2012/003518
§ 371 (c)(1),
(2), (4) Date: Nov. 18, 2013

(87) PCT Pub. No.: WO2012/150842
PCT Pub. Date: Nov. 8, 2012

(65) Prior Publication Data
US 2014/0226509 A1   Aug. 14, 2014

Related U.S. Application Data

(60) Provisional application No. 61/482,232, filed on May 4, 2011.

(51) Int. Cl.
*H04L 12/26* (2006.01)
*H04W 24/10* (2009.01)
(Continued)

(52) U.S. Cl.
CPC ........... *H04W 24/10* (2013.01); *H04B 7/0626* (2013.01); *H04B 7/024* (2013.01)

(58) Field of Classification Search
CPC ... H04W 24/10; H04W 24/00; H04L 43/0852; H04L 43/08; H04B 7/063; H04B 7/0632
See application file for complete search history.

(56) References Cited

U.S. PATENT DOCUMENTS

| | | | |
|---|---|---|---|
| 2011/0085513 A1* | 4/2011 | Chen | H04W 72/042 370/330 |
| 2011/0103247 A1* | 5/2011 | Chen | H04B 7/0452 370/252 |

(Continued)

FOREIGN PATENT DOCUMENTS

| WO | WO 2010/128836 A2 | 11/2010 |
|---|---|---|
| WO | WO 2010/147416 A2 | 12/2010 |
| WO | WO 2011/013986 A2 | 2/2011 |

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213 V10.1.0 Mar. 2011, pp. 1-115.

*Primary Examiner* — Ian N Moore
*Assistant Examiner* — Phong La
(74) *Attorney, Agent, or Firm* — Birch, Stewart, Kolasch & Birch, LLP

(57) ABSTRACT

The present invention relates to a wireless communication system, and more particularly, to a method and device for transmitting/receiving channel state information. A method of a terminal for transmitting channel state information (CSI) according to an embodiment of the present invention includes: Receiving setting information on a basic channel measurement target from a base station; receiving channel measurement target indication information from the base station; performing a channel measurement by using CSI-reference signal (CSI-RS) corresponding to the channel measurement target; and transmitting CSI to the base station.

11 Claims, 11 Drawing Sheets

(a)

(b)

(51) Int. Cl.
*H04B 7/06* (2006.01)
*H04B 7/02* (2006.01)

(56) References Cited

U.S. PATENT DOCUMENTS

| | | | | |
|---|---|---|---|---|
| 2011/0249578 A1* | 10/2011 | Nayeb Nazar | ........ | H04L 1/0027 370/252 |
| 2011/0249582 A1* | 10/2011 | Choi | ..................... | H04L 5/0091 370/252 |
| 2011/0269442 A1* | 11/2011 | Han | ................... | H04W 72/082 455/418 |
| 2012/0051451 A1* | 3/2012 | Kwon | ................... | H04L 5/0053 375/285 |
| 2012/0076017 A1* | 3/2012 | Luo | ...................... | H04L 1/0027 370/252 |
| 2012/0082049 A1* | 4/2012 | Chen | .................... | H04W 24/10 370/252 |
| 2012/0127948 A1* | 5/2012 | Chung | .................. | H04L 5/0053 370/329 |
| 2012/0127950 A1* | 5/2012 | Chung | .................. | H04L 5/0055 370/329 |
| 2012/0176996 A1* | 7/2012 | Kim | .................. | H04W 72/0413 370/329 |
| 2012/0182944 A1* | 7/2012 | Sorrentino | .......... | H04W 74/006 370/329 |
| 2012/0208547 A1* | 8/2012 | Geirhofer | ............ | H04B 7/0626 455/452.2 |
| 2012/0243497 A1* | 9/2012 | Chung | .................. | H04L 5/0055 370/329 |
| 2012/0300653 A1* | 11/2012 | Kishiyama | ............. | H04J 11/005 370/252 |
| 2013/0088980 A1* | 4/2013 | Kim | ...................... | H04W 24/00 370/252 |
| 2013/0142134 A1* | 6/2013 | Zhu | ........................ | H04L 5/001 370/329 |
| 2013/0142163 A1* | 6/2013 | Liu | ...................... | H04L 1/0026 370/329 |
| 2013/0230004 A1* | 9/2013 | Nam | ...................... | H04L 5/001 370/329 |
| 2013/0286993 A1* | 10/2013 | Lee | ........................ | H04L 5/001 370/329 |

\* cited by examiner

FIG. 5
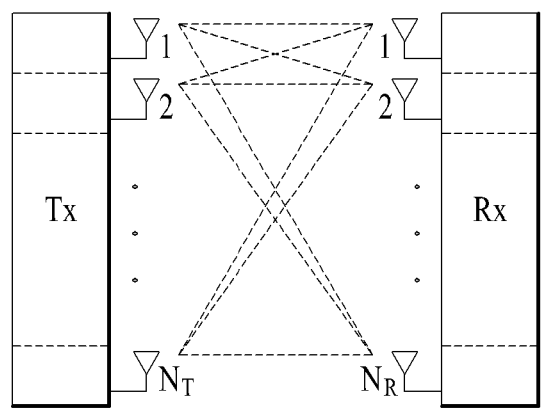
(a)
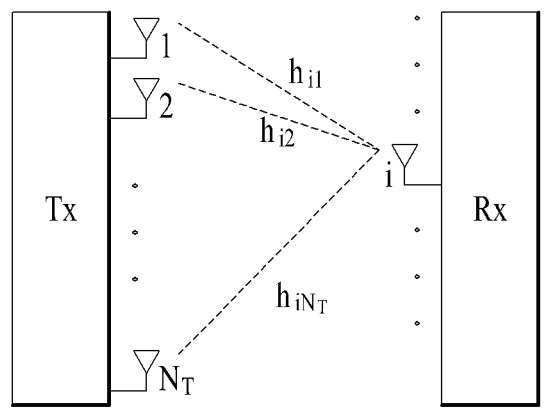
(b)

METHOD AND DEVICE FOR PERFORMING CHANNEL MEASUREMENT BY USING CSI-REFERENCE SIGNAL CORRESPONDING TO RECEIVED CHANNEL MEASUREMENT TARGET

CROSS REFERENCE TO RELATED APPLICATIONS

This application is the National Phase of PCT/KR2012/003518 filed on May 4, 2012, which claims priority under 35 U.S.C. 119(e) to U.S. Provisional Application No. 61/482,232 filed on May 4, 2011, all of which are hereby expressly incorporated by reference into the present application.

TECHNICAL FIELD

The present invention relates to a wireless communication system and, more particularly, to a method and apparatus for transmitting and receiving channel state information.

BACKGROUND ART

Multi-input multi-output (MIMO) refers to technology for improving transmission and reception efficiency of data by using multiple transmit antennas and multiple receive antennas instead of using one transmit antenna and one receive antenna. Upon using a single antenna, a receiving end receives data through a single antenna path. However, using multiple antennas, the receiving end receives data through multiple paths. Accordingly, use of multiple antennas can improve transmission rate and transmission throughput and increase coverage.

To raise multiplexing gain of a MIMO operation, a MIMO transmitting end may employ channel status information (CSI), which is fed back from a MIMO receiving end. The receiving end may determine the CSI by performing channel measurement using a prescribed reference signal (RS) received from the transmitting end.

DISCLOSURE

Technical Problem

An object of the present invention devised to solve the problem is to provide a method for feeding back CSI on a channel measurement object such as a transmission point, an antenna point, or a CSI-RS configuration.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing a method for transmitting channel state information (CSI) at a user equipment, including receiving configuration information about basic channel measurement objects from a base station; receiving channel measurement object indication information indicating channel measurement objects from the base station; performing channel measurement using CSI-reference signals (CSI-RSs) corresponding to the channel measurement objects; and transmitting the CSI to the base station.

In another aspect of the present invention, provided herein is a method for receiving channel state information (CSI) at a base station, including transmitting configuration information about basic channel measurement objects to a user equipment; transmitting channel measurement object indication information indicating channel measurement objects to the user equipment; and receiving the CSI from the user equipment, wherein the CSI is determined based on a channel state measured using CSI-reference signals (CSI-RSs) corresponding to the channel measurement objects.

In another aspect of the present invention, provided herein is a user equipment for transmitting channel state information (CSI), including a reception module for receiving a downlink signal from a base station; a transmission module for transmitting an uplink signal to the base station; and a processor for controlling the user equipment including the reception module and the transmission module, wherein the processor is configured to receive configuration information about basic channel measurement objects from a base station through the reception module; receive channel measurement object indication information indicating channel measurement objects from the base station through the reception module; perform channel measurement using CSI-reference signals (CSI-RSs) corresponding to the channel measurement objects; and transmit the CSI to the base station through the transmission module.

In another aspect of the present invention, provided herein is a base station for receiving channel state information (CSI), including a reception module for receiving an uplink signal from a user equipment; a transmission module for transmitting a downlink signal to the user equipment; and a processor for controlling the base station including the reception module and the transmission module, wherein the processor is configured to transmit configuration information about basic channel measurement objects to a user equipment through the transmission module; transmit channel measurement object indication information indicating channel measurement objects to the user equipment through the transmission module; and receive the CSI from the user equipment through the reception module, and wherein the CSI is determined based on a channel state measured by the user equipment using CSI-reference signals (CSI-RSs) corresponding to the channel measurement objects.

In the embodiments of the present invention, the following may be commonly applied.

The channel measurement object indication information may indicate one or more among the basic channel measurement objects or indicate the channel measurement objects independent of the basic channel measurement objects.

If the channel measurement object indication information is not received, channel measurement may be performed using CSI-RSs corresponding to the basic channel measurement objects.

If the CSI is transmitted through a physical uplink control channel (PUCCH), channel measurement may be performed using CSI-RSs corresponding to the basic channel measurement objects.

If the CSI is transmitted through a physical uplink shared channel (PUSCH), channel measurement may be performed using the CSI-RSs corresponding to the channel measurement objects.

The basic channel measurement objects may be configured by a higher layer.

The channel measurement objects may be at least one of a transmission point, an antenna port, and a CSI-RS configuration.

The channel measurement objects may be at least one of a transmission point set, an antenna point set, and a CSI-RS configuration set.

The channel measurement object indication information may be received through a physical downlink control channel (PDCCH).

The channel measurement object indication information may be indicated using a CSI request bit.

The above overall description and a later detailed description of the present invention are purely exemplary and are given as an additional description of the present invention determined by the appended claims.

Advantageous Effects

According to the present invention, a CSI feedback method for a channel measurement object such as a transmission point, an antenna port, or a CSI-RS configuration can be provided.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

FIG. 5 is a view illustrating the configuration of a MIMO wireless communication system.

BEST MODE

Figure 1:
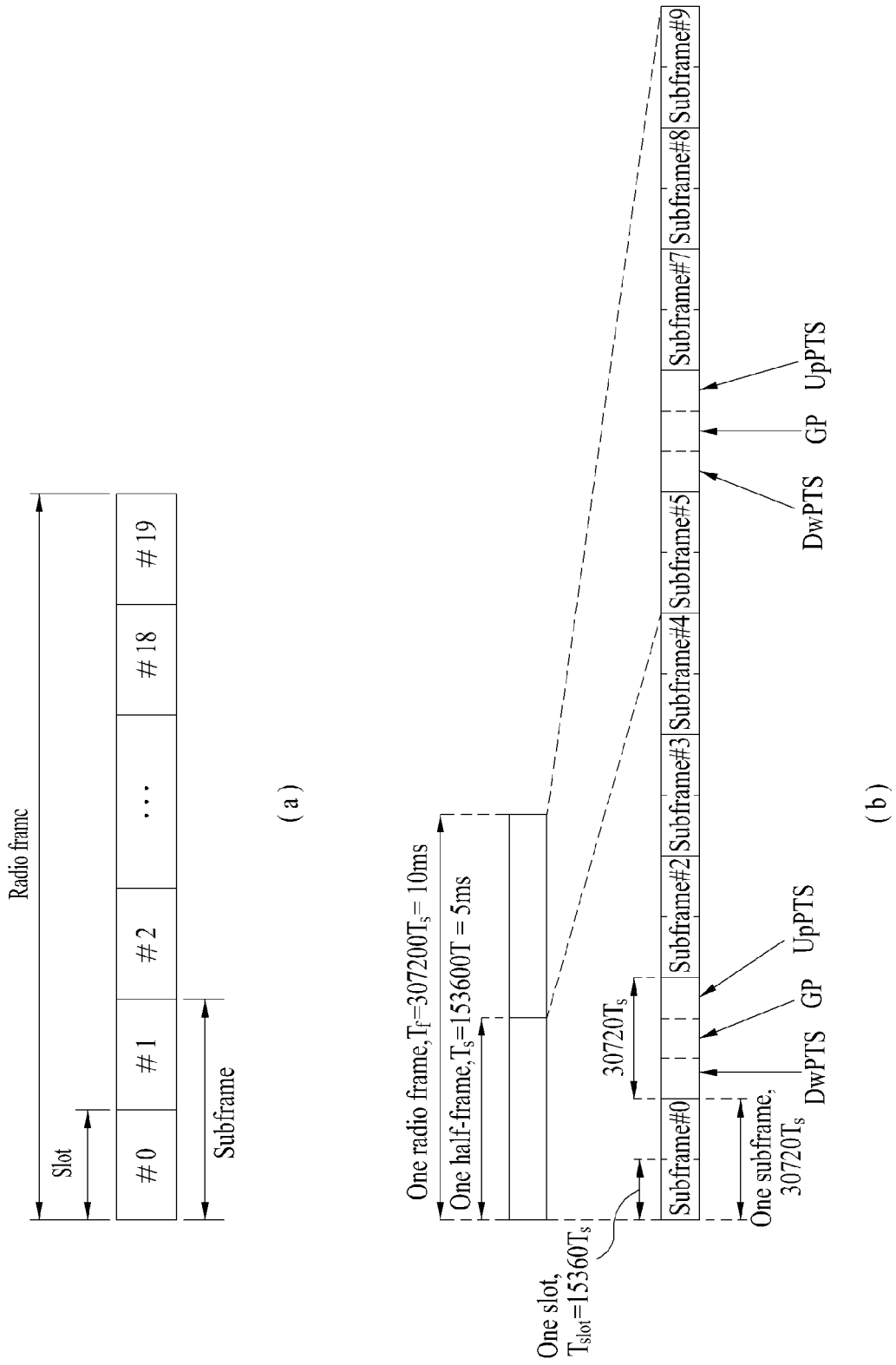
FIG. 1 is a view illustrating the structure of a downlink radio frame.

The embodiments of the present invention described hereinbelow are combinations of elements and features of the present invention in a predetermined form. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given of a data transmission and reception relationship between a base station (BS) and a terminal. Here, the BS refers to a terminal node of a network communicating directly with the terminal. In some cases, a specific operation described as being performed by the BS may be performed by an upper node of the BS.

In other words, it is apparent that, in a network comprised of a plurality of network nodes including the BS, various operations performed for communication with a terminal may be performed by the BS, or network nodes other than the BS. The term 'BS' may be replaced with terms such as fixed station, Node B, eNode B (eNB), access point (AP), etc. The term 'relay' may be replaced with terms such as relay node (RN), relay station (RS), etc. The term 'terminal' may be replaced with terms such as user equipment (UE), mobile station (MS), mobile subscriber station (MSS), subscriber station (SS), etc.

Specific terms used in the following description are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

The embodiments of the present invention can be supported by standard documents disclosed in at least one of wireless access systems including an institute of electrical and electronics engineers (IEEE) 802 system, a $3^{rd}$ generation partnership project (3GPP) system, a 3GPP long term evolution (LTE) system, a 3GPP LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by the above-mentioned documents.

The following technique can be used for a variety of radio access systems, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as IEEE 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of an evolved UMTS (E-UMTS) using E-UTRA. 3GPP LTE employs OFDMA in downlink and employs SC-FDMA in uplink. LTE-A is an evolved version of 3GPP LTE. WiMAX can be explained by IEEE 802.16e (WirelessMAN-OFDMA reference system) and advanced IEEE 802.16m (WirelessMAN-OFDMA advanced system). For clarity, the following description focuses on 3GPP LTE and LTE-A systems. However, technical features of the present invention are not limited thereto.

The structure of a radio frame will now be described with reference to FIG. 1.

In a cellular orthogonal frequency division multiplexing (OFDM) radio packet communication system, uplink/downlink data packet transmission is performed in units of subframes. One subframe is defined as a predetermined time interval including a plurality of OFDM symbols. The 3GPP LTE standard supports a type 1 radio frame structure applicable to frequency division duplexing (FDD) and a type 2 radio frame structure applicable to time division duplexing (TDD).

FIG. 1(a) is a view illustrating the structure of the type 1 radio frame. A downlink radio frame includes 10 subframes each including two slots in the time domain. A time required to transmit one subframe is defined as a transmission time interval (TTI). For example, one subframe may be 1 ms long and one slot may be 0.5 ms long. One slot may include a plurality of OFDM symbols in the time domain and include a plurality of Resource Blocks (RBs) in the frequency domain. Since a 3GPP LTE system adopts OFDMA on downlink, an OFDM symbol indicates one symbol duration. The OFDM symbol may be referred to as an SC-FDMA symbol or a symbol duration. An RB is a resource allocation unit including a plurality of contiguous subcarriers per slot.

The number of OFDM symbols included in one slot may be changed according to configuration of a cyclic prefix (CP). The CP includes an extended CP and a normal CP. For example, if an OFDM symbol is configured by the normal CP, the number of OFDM symbols included in one slot may be 7. If an OFDM symbol is configured by the extended CP, the length of one OFDM symbol is increased and thus the number of OFDM symbols included in one slot is less than that in the case of the normal CP. In case of the extended CP, for example, the number of OFDM symbols per slot may be 6. If a channel state is unstable as in a UE travelling at high speeds, the extended CP may be used in order to further reduce inter-symbol interference.

In case of using the normal CP, since one slot includes 7 OFDM symbols, one subframe includes 14 OFDM symbols. At this time, the first two or three OFDM symbols of each subframe may be allocated to a physical downlink control channel (PDCCH) and the remaining OFDM symbols may be allocated to a physical downlink shared channel (PDSCH).

FIG. 1(b) is a view illustrating the structure of the type 2 radio frame. The type 2 radio frame includes two half frames, each of which includes five subframes, a downlink pilot time slot (DwPTS), a guard period (GP), and an uplink pilot time slot (UpPTS). One subframe includes two slots. DwPTS is used for initial cell search, synchronization, or channel estimation at a UE. UpPTS is used for channel estimation at a BS and uplink transmission synchronization establishment of the UE. GP is used to remove uplink interference between uplink and downlink, caused by multi-path delay of a downlink signal. Meanwhile, one subframe is composed of two slots irrespective of a radio frame type.

The structures of the radio frames are purely exemplary. Accordingly, the number of subframes included in the radio frame, the number of slots included in the subframe, or the number of symbols included in the slot may be changed in various manners.

Figure 2:
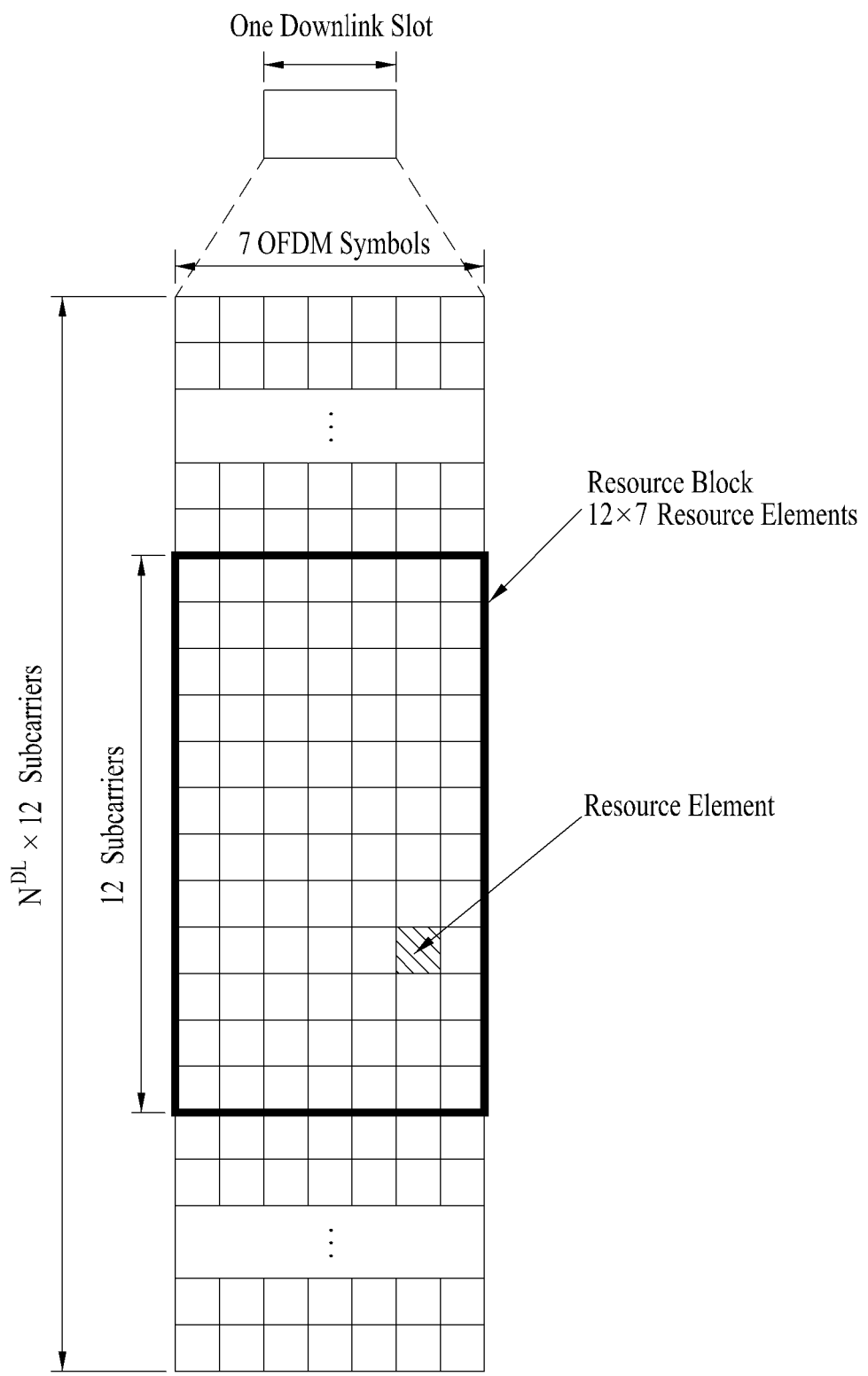
FIG. 2 is a view illustrating an exemplary resource grid for one downlink slot.

FIG. 2 is a view illustrating a resource grid in one downlink slot. One downlink slot has 7 OFDM symbols in the time domain and one RB includes 12 subcarriers in the frequency domain, which does not limit the present invention. For example, one slot includes 7 OFDM symbols in the case of a normal CP, whereas one slot includes 6 OFDM symbols in the case of an extended CP. Each element of the resource grid is referred to as a resource element. One RB includes 12×7 resource elements. The number of RBs, $N^{DL}$, in a downlink slot, depends on downlink transmission bandwidth. An uplink slot may have the same structure as a downlink slot.

Figure 3:
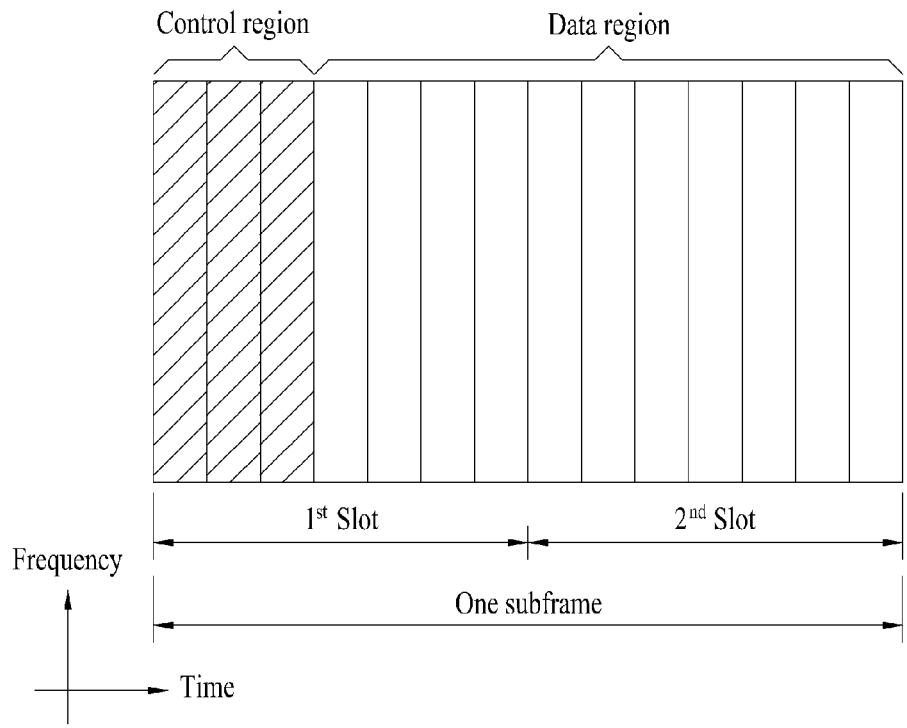
FIG. 3 is a view illustrating the structure of a downlink subframe.

FIG. 3 is a view illustrating the structure of a downlink subframe. A maximum of three OFDM symbols at the start of the first slot in one subframe corresponds to a control region to which control channels are allocated and the other OFDM symbols of the subframe correspond to a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is transmitted on the first OFDM symbol of a subframe and carries information about the number of OFDM symbols used for transmission of control channels in the subframe. The PHICH delivers a HARQ acknowledgment/negative acknowledgment (ACK/NACK) signal as a response to uplink transmission. Control information transmitted through the PDCCH is referred to as downlink control information (DCI). The DCI includes uplink or downlink scheduling information or uplink transmission power control commands for a UE group. The PDCCH may include information about resource allocation and a transport format of a downlink shared channel (DL-SCH), resource allocation information of an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of resource element groups. The format of a PDCCH and the number of available bits for the PDCCH are determined according to a correlation between the number of CCEs and a coding rate provided by the CCEs. A BS determines a PDCCH format according to DCI transmitted to a UE and adds a cyclic redundancy check (CRC) to control information. The CRC is masked by an identifier known as a radio network temporary identifier (RNTI) according to the owner or usage of the PDCCH. If the PDCCH is destined for a specific UE, a cell-RNTI (C-RNTI) of the UE may be masked to the CRC. If the PDCCH is destined for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response, which is a response to a random access preamble transmitted by a UE, a random access-RNTI (RA-RNTI) may be masked to the CRC.

Figure 4:
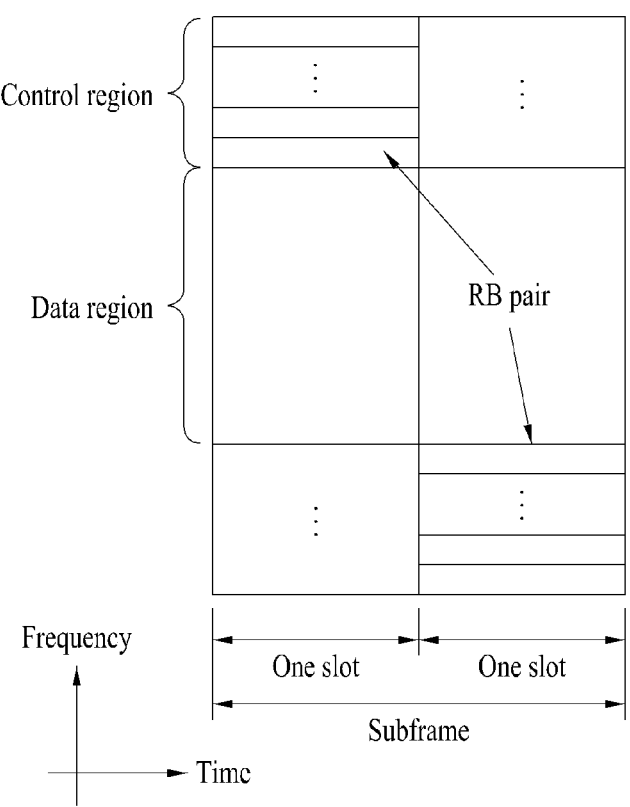
FIG. 4 is a view illustrating the structure of an uplink subframe.

FIG. 4 illustrates the structure of an uplink subframe. The uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier properties, a UE does not transmit a PUSCH and a PUCCH simultaneously. A PUCCH for a UE is allocated to an RB pair in a subframe. RBs belonging to the RB pair occupy different subcarriers in two slots. This is called frequency hopping of the RB pair allocated to the PUCCH over a slot boundary.

Modeling of MIMO System

FIG. 5 illustrates the configuration of a MIMO wireless communication system.

Referring to FIG. 5(a), when the number of transmit antennas and the number of receive antennas are increased to $N_T$ and $N_R$, respectively at both a transmitter and a receiver, theoretical channel transmission capacity increases in proportion to the number of antennas, compared to the use of a plurality of antennas at either the transmitter or the receiver. Therefore, transmission rate and frequency efficiency can be remarkably increased. Along with increase in channel transmission capacity, the transmission rate may be increased, in theory, to the product of a maximum transmission rate $R_o$ that may be achieved with a single antenna and a rate increase rate $R_i$.

$$R_i = \min(N_T, N_R) \quad \text{[Equation 1]}$$

For example, in a MIMO communication system using four transmit antennas and four receive antennas, it is possible to theoretically acquire a transmission rate four times that of a single antenna system. After theoretical increase in capacity provided by the MIMO system was first demonstrated in the mid-1990s, various techniques for substantially improving data transfer rate have been under development. Several of these techniques have already been incorporated into a variety of wireless communication standards including, for example, third generation mobile communication and next-generation wireless local area networks.

Active research up to now related to MIMO technology has focused upon a number of different aspects, including research into information theory related to MIMO communication capacity calculation of various channel environments and in multiple access environments, research into wireless channel measurement and model derivation of MIMO systems, and research into space-time signal processing technologies for improving transmission reliability and transmission rate.

Communication in a MIMO system will be described using a mathematical model in more detail. We assume that the system includes $N_T$ transmit antennas and $N_R$ receive antennas.

Regarding a transmission signal, up to $N_T$ pieces of information can be transmitted through the $N_T$ transmit antennas. Transmission information may be expressed as follows.

$$s = [s_1, s_2, \ldots, s_{N_T}]^T \quad \text{[Equation 2]}$$

Individual pieces of the transmission information $s_1$, $s_2$, . . . , $s_{N_T}$ may have different transmission powers. If the individual transmission powers are denoted by $P_1, P_2, \ldots, P_{N_T}$, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector x, which may be determined by $$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ denotes a weight between an i-th transmit antenna and a j-th piece of information. w is referred to as a precoding matrix.

Given $N_R$ receive antennas, signals received at the receive antennas, $y_1, y_2, \ldots, y_{N_R}$, may be represented as the following vector.

$$y = [y_1, y_2, \ldots, y_{N_R}]^T \quad \text{[Equation 6]}$$

When channels are modeled in the MIMO wireless communication system, the channels may be distinguished according to the indexes of transmit and receive antennas. A channel passing through an i-th receive antenna from a j-th transmit antenna is denoted by $h_{ij}$. Note that the index of a receive antenna precedes the index of a transmit antenna in $h_{ij}$.

Meanwhile, FIG. 5(b) is a view illustrating channels from $N_T$ transmit antennas to an i-th receive antenna. The channels may be collectively represented as a vector or a matrix. Referring to FIG. 5(b), the channels from the $N_T$ transmit antennas to the i-th receive antenna may be expressed as follows.

$$h_i^T = [h_{i1}, h_{i2}, \ldots, h_{iN_T}] \quad \text{[Equation 7]}$$

Hence, all channels from the $N_T$ transmit antennas to the $N_R$ receive antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience additive white Gaussian noise (AWGN) after passing through the channel matrix H. AWGN $n_1, n_2, \ldots, n_{N_R}$ added to the $N_R$ receive antennas is given as the following vector.

$$n = [n_1, n_2, \ldots, n_{N_R}]^T \quad \text{[Equation 9]}$$

From the above mathematical model, the received signal may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} +$$

$$= \begin{bmatrix} n_1 \\ n_2 \\ \vdots \\ n_i \\ \vdots \\ n_{N_R} \end{bmatrix} = Hx + n$$

[Equation 10]

The numbers of rows and columns in the channel matrix H representing channel states are determined according to the numbers of receive and transmit antennas. The number of rows in the channel matrix H is equal to the number of receive antennas, $N_R$, and the number of columns in the channel matrix H is equal to the number of transmit antennas, $N_T$. That is, the channel matrix H is an $N_R \times N_T$ matrix.

The rank of a matrix is defined as the smaller of the number of independent rows and the number of independent columns in the matrix. Accordingly, the rank of the matrix is not larger than the number of rows or columns of the matrix. The rank of the channel matrix H, rank(H), is restricted as follows.

$$\text{rank}(H) \leq \min(N_T, N_R) \quad \text{[Equation 11]}$$

The rank of a matrix may also be defined as the number of non-zero Eigen values, when the matrix is decomposed by Eigen value decomposition. Similarly, the rank of a matrix may be defined as the number of non-zero singular values, when the matrix is decomposed by singular value decomposition. Therefore, the physical meaning of the rank of a channel matrix may be the maximum number of different pieces of information that can be transmitted on a given channel.

In MIMO transmission, the term 'rank' is the number of paths through which signals are independently transmitted, and the term 'number of layers' is the number of signal streams transmitted through respective paths at a specific time point and a specific frequency resource. In general, since a transmitter transmits as many layers as the rank of signal transmission, rank has the same meaning as the number of layers, unless otherwise noted.

Coordinated Multi-Point (CoMP)

According to enhanced system performance requirements of the 3GPP LTE-A system, CoMP transmission and reception technology (also referred to as co-MIMO, collaborative MIMO, or network MIMO) has been proposed. CoMP can increase the performance of a UE located at a cell edge and increase average sector throughput.

Generally, the performance of a UE located at a cell edge and average sector throughput may be decreased due to inter-cell interference (ICI) in a multi-cellular environment with a frequency reuse factor of 1. To reduce ICI, the legacy LTE system has adopted a simple passive technique such as fractional frequency reuse (FFR) based on UE-specific power control so that a UE located at a cell edge may have appropriate throughput performance in an environment constrained by interference. However, it is desirable to reduce ICI or reuse ICI as a desired signal for the UE, rather than to decrease utilization of frequency resources per cell. For this purpose, a CoMP transmission technique may be adopted.

Downlink CoMP schemes are broadly classified into joint processing (JP) and coordinated scheduling/beamforming (CS/CB).

According to the JP scheme, each point (BS) of a CoMP cooperation unit may use data. The CoMP cooperation unit refers to a set of BSs used for a CoMP transmission scheme. The JP scheme is further divided into joint transmission (JT) and dynamic cell selection (DCS).

JT is a technique of transmitting PDSCHs from a plurality of points (partial or all points of the CoMP cooperation unit) at one time. That is, a plurality of transmission points may simultaneously transmit data to a single UE. The JT scheme can improve the quality of a received signal coherently or non-coherently and actively eliminate interference with other UEs.

DCS is a technique of transmitting PDSCHs from one point (of a CoMP cooperation unit) at one time. That is, one point transmits data to a single UE at a specific time point, while the other points of the CoMP cooperation unit do not transmit data to the UE at the time point. A transmission point for transmitting data to the UE may be dynamically selected.

Meanwhile, in the CS/CB scheme, CoMP cooperation units may perform cooperative beamforming for data transmission to a single UE. While only a serving cell transmits data to the UE, user scheduling/beamforming may be determined through coordination among cells of the CoMP cooperation unit.

Uplink CoMP reception refers to reception of an uplink signal through cooperation among a plurality of geographically separated points. Uplink CoMP schemes include joint reception (JR) and coordinated scheduling/beamforming (CS/CB).

In JR, a plurality of reception points receives a signal transmitted through a PUSCH. In CS/CB, while only one point receives a PUSCH, user scheduling/beamforming is determined through coordination among cells of a CoMP cooperation unit.

In this CoMP system, multi-cell BSs can commonly support data transmission for a UE. In addition, the BSs simultaneously support one or more UEs using the same radio frequency resources, thereby increasing system performance. The BSs may also perform space division multiple access (SDMA) based on CSI between the UE and the BSs.

A serving BS and one or more cooperative BSs are connected to a scheduler through a backbone network in the CoMP system. The scheduler may receive feedback channel information about the channel states between each UE and cooperative BSs, measured by the cooperative BSs through the backbone network, and operate based on the channel information. For example, the scheduler may schedule information for cooperative MIMO for the serving BS and the one or more cooperative BSs. That is, the scheduler may directly command each BS to perform a cooperative MIMO operation.

As described above, a CoMP system operates as a virtual MIMO system by grouping a plurality of cells into one group. Basically, the CoMP system adopts a MIMO communication scheme using multiple antennas.

Further, while the CoMP system has been described under the assumption of coordinated transmission between cells, the same principle may be applied to coordinated transmission between a plurality of transmission points (TPs) in one macro cell.

Reference Signal (RS)

In a wireless communication system, a packet is transmitted on a radio channel and thus distortion of a signal may occur during transmission. To receive the signal successfully, a receiver should compensate for distortion of the received signal using channel information. To acquire the channel information, a transmitter transmits a signal known to both the transmitter and the receiver and the receiver acquires knowledge of channel information based on the distortion degree of the signal received on the radio channel. This signal is called a pilot signal or an RS.

In the case of data transmission and reception through multiple antennas, the receiver should be aware of channel states between transmit antennas and receive antennas for successful signal reception. Accordingly, a separate RS should be present for each transmit antenna.

In a mobile communication system, RSs are categorized into two types according to purpose thereof: RSs used for channel information acquisition and RSs used for data demodulation. The RSs for channel information acquisition allow a UE to acquire channel information and thus should be transmitted in wideband. Such RSs should be received and measured at a UE even when the UE does not receive downlink data in a specific subframe, and are used even for measurement for handover. Meanwhile, the RSs used for data demodulation are transmitted on a corresponding resource during downlink transmission of the BS. The UE can perform channel estimation by receiving the RSs and thus can demodulate data. Such RSs should be transmitted in a data transmission region.

In a legacy 3GPP LTE (e.g. 3GPP LTE release-8) system, two types of downlink RSs are defined for a unicast service: a common RS (CRS) and a dedicated RS (DRS). The CRS is used for information acquisition for a channel state and measurement for handover and may be referred to as a cell-specific RS. The DRS is used for data demodulation and may be referred to as a UE-specific RS. In the legacy 3GPP LTE system, the DRS is used only for data demodulation and the CRS is used for both channel information acquisition and data demodulation.

The CRS is cell-specifically transmitted and is transmitted in every subframe in wideband. The CRS may be transmitted with respect to a maximum of four antenna ports depending on the number of transmit antennas of the BS. For example, if the number of transmit antennas of the BS is 2, CRSs for antenna ports 0 and 2 are transmitted and, if it is 4, CRSs for antenna ports 0, 1, 2, and 3 are transmitted.

Figure 6:
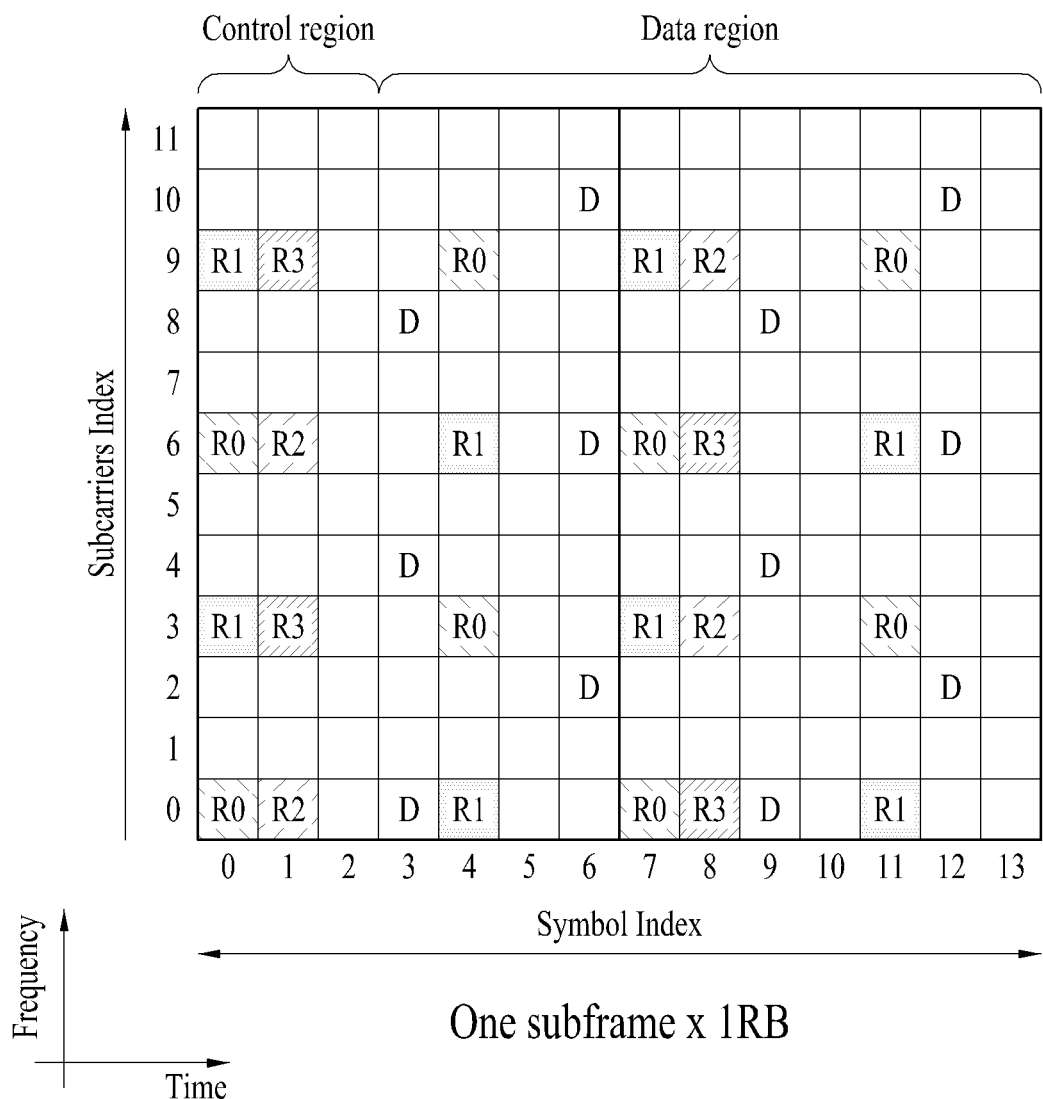
FIG. 6 is a view illustrating conventional CRS and DRS patterns.

FIG. 6 is a view illustrating CRS and DRS patterns in one RB pair (in the case of a normal CP, 14 OFDM symbols in time by 12 subcarriers in frequency) in a system in which a BS supports four transmit antennas. In FIG. 6, resource elements (REs) indicated by 'R0', 'R1', 'R2', and 'R3' denote the positions of CRSs for antenna ports 0, 1, 2, and 3, respectively, and REs labeled 'D' denote the positions of DRSs defined in the LTE system.

An LTE-A system, an evolved form of the LTE system, can support a maximum of 8 transmit antennas on downlink. Accordingly, RSs for up to 8 transmit antennas should be supported. In the LTE system, since downlink RSs are defined for up to four antenna ports, RSs for added antenna ports when the BS includes from 4 up to 8 downlink transmit antennas in the LTE-A system should further be defined. As the RSs for a maximum of 8 transmit antenna ports, both RSs for channel measurement and RSs for data demodulation should be considered.

One important consideration in design of the LTE-A system is backward compatibility. Backward compatibility refers to support of a legacy LTE UE that can properly operate in the LTE-A system. In terms of RS transmission, if RSs for up to 8 transmit antenna ports are added in a time-frequency region in which CRSs defined in LTE standards are transmitted in every subframe over all bands, RS overhead excessively increases. Hence, when newly designing RSs for up to 8 antenna ports, reduction of RS overhead should be considered.

Newly introduced RSs in the LTE-A system may be categorized into two types. One is a channel state information RS (CSI-RS) for channel measurement used to select a transmission rank, a modulation and coding scheme (MCS), a precoding matrix index (PMI), etc. and the other a modulation RS (DMRS) used to demodulate data transmitted through a maximum of 8 transmit antennas.

The CSI-RS for channel measurement is mainly designed for channel measurement as opposed to the CRS in the legacy LTE system, used for channel measurement and handover measurement and simultaneously for data demodulation. Obviously, the CSI-RS may also be used for handover measurement. Since the CSI-RS is transmitted only for information acquisition regarding a channel state, the CSI-RS need not be transmitted in every subframe as opposed to the CRS in the legacy LTE system. Hence, to reduce CRS-RS overhead, the CSI-RS may be designated to be intermittently (e.g. periodically) transmitted in the time domain.

If data is transmitted in a certain downlink subframe, a dedicated DMRS is transmitted to a UE for which data transmission is scheduled. That is, the DMRS may be referred to as a UE-specific RS. A UE-specific dedicated DMRS may be designed for transmission only in a resource region in which an associated UE is scheduled, i.e. in a time-frequency region in which data is transmitted to the UE.

Figure 7:
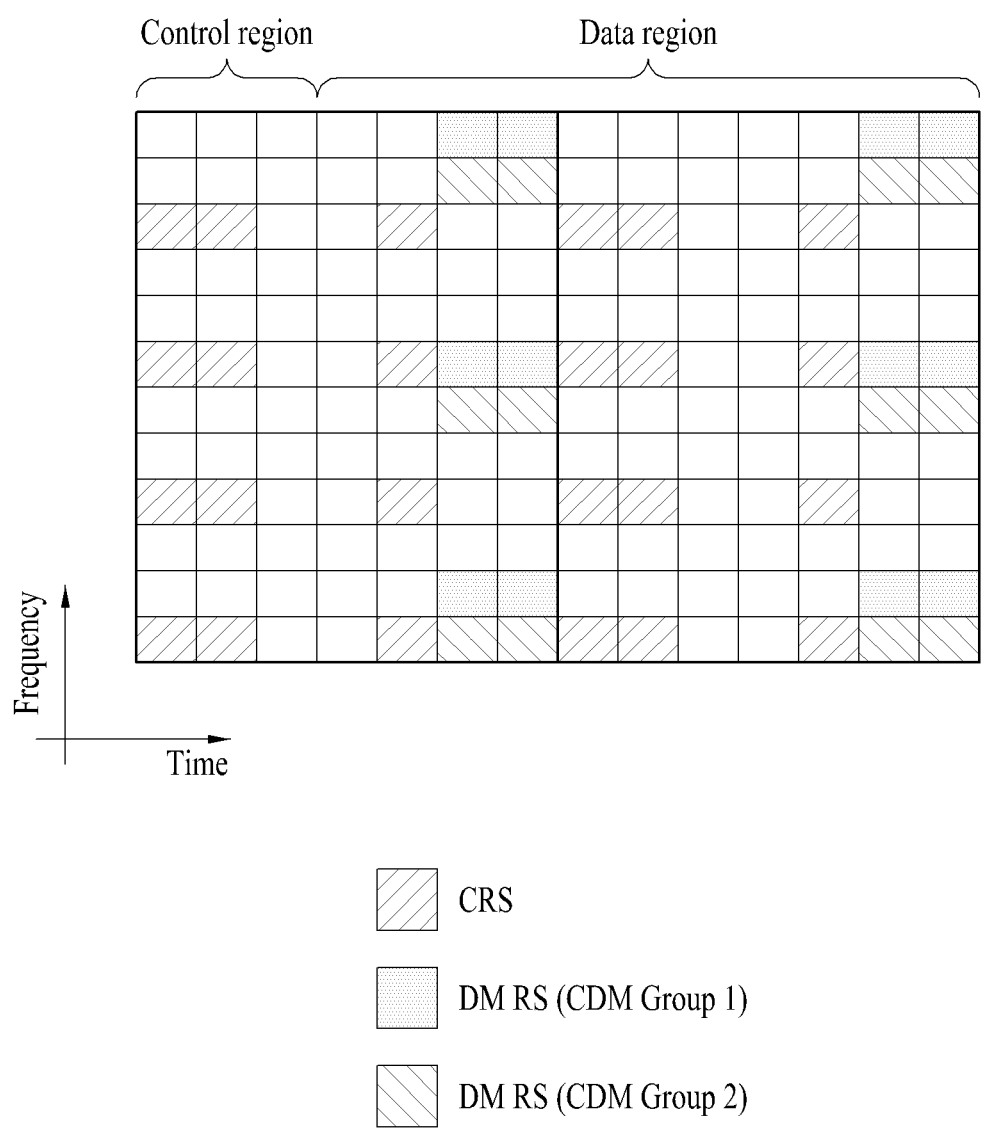
FIG. 7 is a view illustrating an exemplary DMRS pattern.

FIG. 7 is a view illustrating an exemplary DMRS pattern defined in an LTE-A system. FIG. 7 illustrates the position of REs on which DMRSs are transmitted in one RB pair (in the case of a normal CP, 14 OFDM symbols in time by 12 subcarriers in frequency) in which downlink data is transmitted. The DMRSs may be transmitted with respect to four antenna ports (antenna port indexes 7, 8, 9, and 10) additionally defined in the LTE-A system. The DMRSs for different antenna ports may be distinguished by being located in different frequency resources (subcarriers) and/or different time resources (OFDM symbols) (i.e. may be multiplexed by an FDM and/or TDM scheme). The DMRSs for different antenna ports located on the same time-frequency resources may be distinguished by orthogonal codes (i.e. may be multiplexed by a CDM scheme). In the example of FIG. 7, DMRSs for antenna ports 7 and 8 may be located on REs indicated as DMRS CDM group 1 and may be multiplexed by orthogonal codes. Similarly, in the example of FIG. 7, DMRSs for antenna ports 9 and 10 may be located on REs indicated as DMRS CDM group 2 and may be multiplexed by orthogonal codes.

When the BS transmits DMRSs, the same precoding as precoding applied to data is applied to the DMRSs. Accordingly, channel information estimated using the DMRSs (or UE-specific RSs) at the UE is precoded channel information. The UE may easily perform data demodulation using the precoded channel information estimated through the DMRSs. However, since the UE is unable to recognize precoding information applied to the DMRS, the UE cannot acquire channel information which is not precoded from the DMRS. The UE may acquire channel information which is not precoded using additional RSs other than DMRSs, i.e., using the above-described CSI-RSs.

Figure 8:
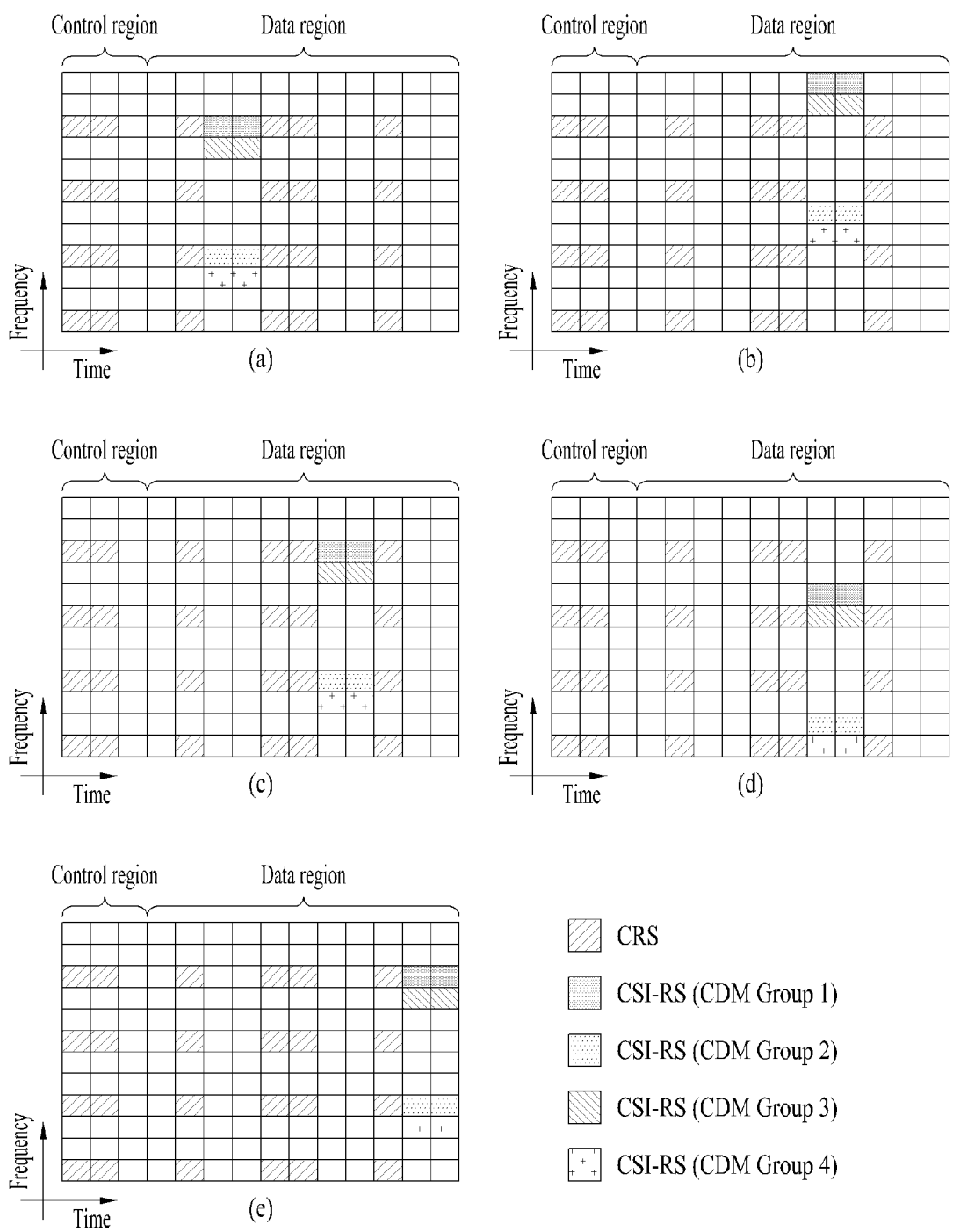
FIG. 8 is a view illustrating an exemplary CSI-RS pattern.

FIG. 8 is a view illustrating an exemplary CSI-RS pattern defined in an LTE-A system. FIG. 8 illustrates the position of REs on which CSI-RSs are transmitted in one RB pair (in the case of a normal CP, 14 OFDM symbols in time by 12 subcarriers in frequency) in which downlink data is transmitted. One of the CSI-RS patterns shown in FIGS. 8(a) to 8(e) may be used in any downlink subframe. The CSI-RSs may be transmitted with respect to 8 antenna ports (antenna port indexes 15, 16, 17, 18, 19, 20, 21, and 22) additionally defined in the LTE-A system. The CSI-RSs for different antenna ports may be distinguished by being located in different frequency resources (subcarriers) and/or different time resources (OFDM symbols) (i.e. may be multiplexed by an FDM and/or TDM scheme). The DMRSs for different antenna ports located on the same time-frequency resources may be distinguished by orthogonal codes (i.e. may be multiplexed by a CDM scheme). In the example of FIG. 8(a), CSI-RSs for antenna ports 15 and 16 may be located on REs indicated as DMRS CDM group 1 and may be multiplexed by orthogonal codes. In the example of FIG. 8(a), CSI-RSs for antenna ports 17 and 18 may be located on REs indicated as DMRS CDM group 2 and may be multiplexed by orthogonal codes. In the example of FIG. 8(a), CSI-RSs for antenna ports 19 and 20 may be located on REs indicated as DMRS CDM group 3 and may be multiplexed by orthogonal codes. In the example of FIG. 8(a), CSI-RSs for antenna ports 21 and 22 may be located on REs indicated as DMRS CDM group 4 and may be multiplexed by orthogonal codes. The same principle as described with reference to FIG. 8(a) may be applied to FIGS. 8(b) to 8(e).

The RS patterns of FIGS. 6 to 8 are purely exemplary and RS patterns applied to various embodiments of the present invention are not restricted to a specific RS pattern. That is, the embodiments of the present invention can be identically applied even when RS patterns different from the RS patterns of FIGS. 6 to 8 are defined and used.

CSI-RS Configuration

As described above, in the LTE-A system supporting a maximum of 8 transmit antennas on downlink, the BS should transmit CSI-RSs for all antenna ports. Since transmission of CSI-RSs for the 8 transmit antennas in total in every subframe entails considerable overhead, the CSI-RSs should be intermittently transmitted in the time domain to reduce overhead instead of transmission in every subframe. Hence, the CSI-RSs may be transmitted at a period of a multiple of an integer of one subframe or may be transmitted with a specific transmission pattern.

In this case, the transmission period and pattern of the CSI-RSs may be configured by a network (e.g. BS). To perform measurement based on the CSI-RSs, the UE needs to be aware of a CSI-RS configuration for each CSI-RS antenna port of a cell (or TP) to which the UE belongs. The CSI-RS configuration may include a downlink subframe index in which a CSI-RS is transmitted, a time-frequency location of a CSI-RS RE in a transmission subframe (e.g. CSI-RS patterns as shown in FIGS. 8(a) to 8(e)), and a CSI-RS sequence (e.g. a sequence used for a CSI-RS, which is pseudo-randomly generated according to a predetermined rule based on a slot number, a cell ID, CP length, etc.). That is, a plurality of CSI-RS configurations may be used in a given BS and the BS may inform a UE (or UEs) in the cell of a CSI-RS configuration to be used among the plural CSI-RS configurations.

The plural CSI-RS configurations may or may not include one CSI-RS configuration, transmit power of which is assumed to be non-zero CSI-RS by the UE. In addition, the plural CSI-RS configurations may or may not include one or more CSI-RS configurations, transmit power of which is assumed to be zero by the UE.

Each bit of a parameter for a CSI-RS configuration of zero transmit power (e.g. a bitmap ZeroPowerCSI-RS parameter of 16 bits) may correspond to a CSI-RS configuration (or REs to which CSI-RSs may be allocated according to the CSI-RS configuration) by a higher layer. The UE may assume that transmit power in CSI-RS REs of a CSI-RS configuration corresponding to a bit set to 1 in the parameter to be 0.

Moreover, since CSI-RSs for individual antenna ports need to be distinguished therebetween, resources carrying the CSI-RSs for the antenna ports should be orthogonal. As described with reference to FIG. 8, CSI-RSs for the individual antenna ports may be multiplexed by FDM, TDM, and/or CDM using orthogonal frequency resources, orthogonal time resources, and/or orthogonal code resources.

When the BS informs UEs in a cell of information about CSI-RSs (CSI-RS configurations), information about time-frequency to which a CSI-RS for each antenna port is mapped should be indicated. Specifically, information about time may include subframe numbers in which the CSI-RS is transmitted, a period at which the CSI-RS is transmitted, a subframe offset with which the CSI-RS is transmitted, and an OFDM symbol number in which CSI-RS REs of a specific antenna are transmitted. Information about frequency may include a frequency spacing with CSI-RS REs of a specific antenna are transmitted and an offset or shift value of REs in the frequency domain.

Figure 9:
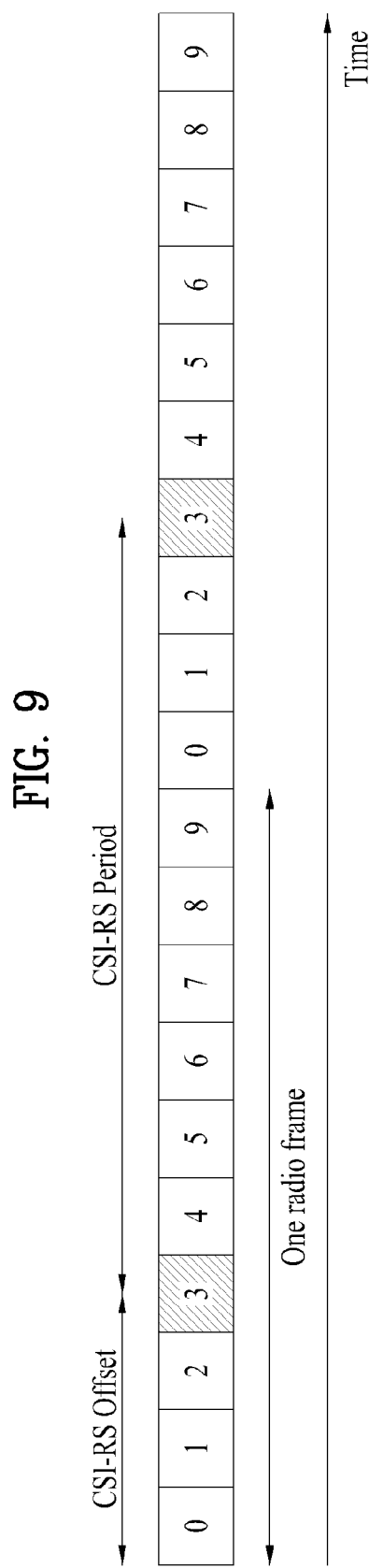
FIG. 9 is a view explaining an example of a periodic CSI-RS transmission scheme.

FIG. 9 is a view explaining an example of a periodic CSI-RS transmission scheme. A CSI-RS may be transmitted at the period of a multiple of an integer of one subframe (e.g. 5-subframe period, 10-subframe period, 20-subframe period, 40-subframe period, or 80-subframe period).

In FIG. 9, one radio frame includes 10 subframes (subframe numbers 0 to 9). In the illustrated example of FIG. 9, a CSI-RS transmission period of the BS is 10 ms (i.e. 10 subframes) and a CSI-RS transmission offset is 3. BSs may have different offset values so that CSI-RSs of multiple cells may be evenly distributed in the time domain. If the CSI-RS is transmitted at a period of 10 ms, an offset value may be one of 0 to 9. Similarly, if the CSI-RS is transmitted at a period of 5 ms, the offset value may be one of 0 to 4. If the CSI-RS is transmitted at a period of 20 ms, the offset value may be one of 0 to 19. If the CSI-RS is transmitted at a period of 40 ms, the offset value may be one of 0 to 39 and, if the CSI-RS is transmitted at a period of 80 ms, the offset value may be one of 0 to 79. The offset value indicates a value of a subframe in which the BS, which transmits the CSI-RS at a predetermined period, starts CSI-RS transmission. If the BS informs the UE of the CSI-RS transmission period and the offset value, the UE may receive the CSI-RS of the BS at locations of corresponding subframes using the period and offset value. The UE may measure a channel through the received CSI-RSs and report information such as a channel quality indicator (CQI), a precoding matrix index (PMI), and/or rank indicator (RI) as a result of channel measurement. In this document, the CQI, OMI, and RI may be collectively referred to as CQI (or CSI) except for the case of distinguishing therebetween. The above information related to the CSI-RS is cell-specific information and may be commonly applied to UEs in a cell. The CSI-RS transmission period and offset may be separately designated per CSI-RS configuration. For example, different CSI-RS transmission periods and offsets may be set with respect to a CSI-RS configuration indicating a CSI-RS transmitted with zero power and a CSI-RS configuration indicating a CSI-RS transmitted with non-zero power, which will be described later.

As opposed to a CRS transmitted in all subframes in which a PDSCH can be transmitted, the CSI-RS may be configured such that transmission thereof is performed only in partial subframes. For example, a set of CSI subframes $C_{CSI,0}$ and $C_{CSI,1}$ may be configured by a higher layer. A CSI reference resource (i.e. a predetermined resource region referred to calculate CSI) may belong to either $C_{CSI,0}$ or $C_{CSI,1}$ or belong to neither $C_{CSI,0}$ nor $C_{CSI,1}$. Hence, if the CSI subframe set $C_{CSI,0}$ and $C_{CSI,1}$ is configured by a higher layer, the UE may not expect that trigger for the CSI reference resource (or indication for CSI calculation) in a subframe which does not belong to any subframe of the CSI subframe set will be received.

Alternatively, the CSI reference resource may be configured in a valid downlink subframe. The valid downlink subframe may be configured as a subframe satisfying various conditions. In the case of periodic CSI reporting, one of the conditions is a subframe belonging to a CSI subframe set linked to periodic CSI reporting when the UE is configured for the CSI subframe set.

The UE may derive a CQI index from the CSI reference resource in consideration of the following assumptions (refer to 3GPP TS 36.213 for details).

The first three OFDM symbols are occupied by control signaling

No resource elements used by primary synchronization signals, secondary synchronization signals, or a physical broadcast channel (PBCH)

CP length of non-MBSFN subframes

Redundancy Version 0

If a CSI-RS is used for channel measurement, the ratio of PDSCH energy per resource element (EPRE) to CSI-RS EPRE conforms to a predetermined rule For CSI reporting in transmission mode 9 (i.e. mode supporting 8-layer transmission in total), if the UE is configured for PMI/RI reporting, the UE assumes that DMRS overhead is consistent with the most recently reported rank (e.g. in the case of two or more antenna ports (i.e. rank 2 or less) as described in FIG. 7, DMRS overhead in one RB pair is 12 REs, whereas DMRS overhead in the case of three or more antenna ports (i.e. rank 3 or more) is 24 REs. Therefore, a CQI index may be calculated under the assumption of DMRS overhead corresponding to the most recently reported rank value)

No REs allocated for a CSI-RS and a zero-power CSI-RS

No REs allocated for a positioning RS (PRS)

PDSCH transmission scheme conforms to transmission mode currently configured for the UE (which may be a default mode)

The ratio of PDSCH EPRE to CRS EPRE conforms to a predetermined rule.

The BS may inform UEs of such a CSI-RS configuration through, for example, radio resource control (RRC) signaling. That is, information about the CSI-RS configuration may be provided to UEs in a cell using dedicated RRC signaling. For example, while a UE establishes connection with the BS through initial access or handover, the BS may inform the UE of the CSI-RS configuration through RRC signaling. Alternatively, upon transmitting an RRC signaling message demanding channel state feedback based on CSI-RS measurement to a UE, the BS may inform the UE of the CSI-RS configuration through the RRC signaling message.

Meanwhile, locations of the CSI-RS in the time domain, i.e. a cell-specific subframe configuration period and a cell-specific subframe offset, may be summarized as shown in the following Table 1.

TABLE 1

| CSI-RS subframe configuration $I_{CSI\text{-}RS}$ | CSI-RS periodicity $T_{CSI\text{-}RS}$ (subframe) | CSI-RS subframe offset $\Delta_{CSI\text{-}RS}$ (subframe) |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

As described previously, a parameter $I_{CSI\text{-}RS}$ may be separately configured with respect to a CSI-RS assumed to have non-zero transmit power by the UE and a CSI-RS assumed to have zero transmit power by the UE. A subframe including a CSI-RS may be expressed by the following Equation 12 (In Equation 12, $n_f$ is a system frame number and $n_s$ is a slot number).

$$(10n_f + \lfloor n_s/2 \rfloor - \Delta_{CSI\text{-}RS}) \bmod T_{CSI\text{-}RS} = 0 \qquad [\text{Equation 12}]$$

CSI Feedback

A MIMO scheme may be divided into an open-loop scheme and a closed-loop scheme. The open-loop MIMO scheme refers to MIMO transmission at a transmitter without the need for CSI feedback from a MIMO receiver. The closed-loop MIMO scheme refers to MIMO transmission at the transmitter by receiving CSI fed back from the MIMO receiver. In the closed-loop MIMO scheme, each of the transmitter and receiver may perform beamforming based on CSI to obtain multiplexing gain of MIMO transmit antennas. The transmitter (e.g. BS) may allocate an uplink control channel or an uplink shared channel to the receiver (e.g. UE) so that the receiver (e.g. UE) may feed back the CSI.

The UE may estimate and/or measure a downlink channel using a CRS and/or a CSI-RS. CSI, which is fed back to the BS by the UE, may include RI, PMI, and CQI.

The RI indicates information about a channel rank. The channel rank refers to a maximum number of layers (or streams) capable of transmitting different information on the same time-frequency resource. Since a value of the rank is mainly determined by long-term fading of a channel, generally, the rank may be fed back at a longer period (i.e. less frequently) than the PMI and CQI.

The PMI is information about a precoding matrix used for transmission from the transmitter and is a value reflecting spatial characteristics of a channel. Precoding refers to mapping a transmit layer to a transmit antenna. A layer-to-antenna mapping relationship may be determined by the precoding matrix. The PMI corresponds to a precoding matrix index of the BS preferred by the UE based on a metric such as a signal-to-interference plus noise ratio (SINR). To reduce feedback overhead of precoding information, the transmitter and the receiver pre-share a codebook including multiple precoding matrices and only an index indicating a specific precoding matrix in the codebook may be fed back. For example, the PMI may be determined based on the most recently reported RI.

The CQI is information indicating channel quality or channel strength. That is, a CQI index that is fed back indicates an associated modulation scheme and code rate. The CQI configures a specific resource region (e.g. a region specified by a valid subframe and/or a physical RB) as a CQI reference resource and may be calculated if a PDSCH can be received without exceeding a predetermined error probability (e.g. 0.1) under the assumption that PDSCH transmission is present on the CQI reference resource. Generally, the CQI is a value reflecting a received SINR which can be obtained when the BS configures a spatial channel using the PMI. For instance, the CQI may be calculated based on the most recently reported RI and/or PMI.

In a system supporting an extended antenna configuration (e.g. an LTE-A system), additional acquisition of multi-user (MU)-MIMO diversity using an MU-MIMO scheme is considered. In the MU-MIMO scheme, when the BS performs downlink transmission using CSI fed back by one UE among multiple users, it is necessary to prevent interference with another UE from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

Thus, a new CSI feedback method, improving upon existing CSI consisting of an RI, a PMI, and a CQI, may be applied so as to measure and report more accurate CSI. For example, precoding information fed back by the receiver may be indicated by a combination of two PMIs (e.g. i1 and i2). Then, a more precise PMI may be fed back and a more precise CQI may be calculated and reported based on the precise PMI.

Meanwhile, CSI may be periodically transmitted through a PUCCH or may be aperiodically transmitted through a PUSCH. In addition, various reporting modes may be defined depending upon which ones of an RI, a first PMI (e.g. W1), a second PMI (e.g. W2), and a CQI are fed back or whether the fedback PMI and/or CQI is for a wideband (WB) or for a subband (SB).

Uplink DCI Format

Control information transmitted through a PDCCH may differ in size and usage thereof according to a downlink control information (DCI) format and differ in the size of the PDCCH according to coding rate. For example, DCI formats used in legacy 3GPP LTE release-8/9 may be defined as follows.

TABLE 2

| DCI Format | Description |
|---|---|
| 0 | PUSCH scheduling |
| 1 | PDSCH scheduling (one codeword) |
| 1A | Compact PDSCH scheduling (one codeword) |
| 1B | Closed-loop single-rank transmission |
| 1C | Paging, random access response, and dynamic broadcast control channel (BCCH) |
| 1D | MU-MIMO |
| 2 | Rank-adaptive closed-loop spatial multiplexing mode scheduling |
| 2A | Rank-adaptive open-loop spatial multiplexing mode scheduling |
| 3 | Transmit power control command for PUCCH and PUSCH (2-bit power control) |
| 3A | Transmit power control command for PUCCH and PUSCH (1-bit power control) |

Among the DCI formats, DCI format 0 related to uplink scheduling may include a flag field for distinguishing between DCI format 0 and format 1A, a field indicating whether PUSCH frequency hopping is applied, an RB allocation information field, an MCS and redundancy version (RV) field, a new data indicator (NDI) field, a transmit power control command field for a PUSCH, a cyclic shift field applied to an uplink demodulation reference signal (DMRS), an uplink index field in the case of TDD, a downlink allocation index field in the case of TDD, and a CQI request field.

Meanwhile, DCI format 4 may be defined in addition to the DCI formats of the above Table 2 in order to support uplink MIMO transmission. DCI format 4 may include a carrier indicator field, an RB allocation information field, a transmit power control command field for a PUSCH, a cyclic shift and orthogonal cover code index field applied to an uplink DMRS, an uplink index field in the case of TDD, a downlink allocation index field in the case of TDD, a CSI request field, an SRS request field, a multi-cluster flag field, an MCS/RV/NDI field for each transport block, and a precoding information and number-of-layers field.

The aforementioned DCI formats 0 and 4 may be referred to as uplink DCI format. The uplink DCI format may include a CSI (or CQI) request field. The CSI request field is composed of 1 or 2 bits and indicates control information for triggering aperiodic CSI reporting (the 2-bit field is applied only to a UE configured for more than one downlink cell (i.e. downlink carrier)). The 2-bit CSI request field may be defined as shown in the following Table 3.

TABLE 3

| Value of CSI request field | Description |
|---|---|
| '00' | Aperiodic CSI reporting is not triggered |
| '01' | Aperiodic CSI reporting for serving cell c is triggered |
| '10' | Aperiodic CSI reporting for serving cells of a first set configured by a higher layer is triggered |
| '11' | Aperiodic CSI reporting for serving cells of a second set configured by a higher layer is triggered |

CSI Reporting Method in Multi-Antenna System

A general multi-antenna system may assume the case in which a plurality of physical antennas is present at an arrangement location of one BS. As an evolved type of the multi-antenna system, a system in which geographic locations of multiple physical antennas are distributed may be considered. Such an evolved type of the multi-antenna system may include, for example, a distributed antenna system or a CoMP system and will be referred to as a non-uniform network hereinbelow. The present invention proposes a CSI feedback method that is applicable to the existing multi-antenna system and the non-uniform network.

Figure 10:
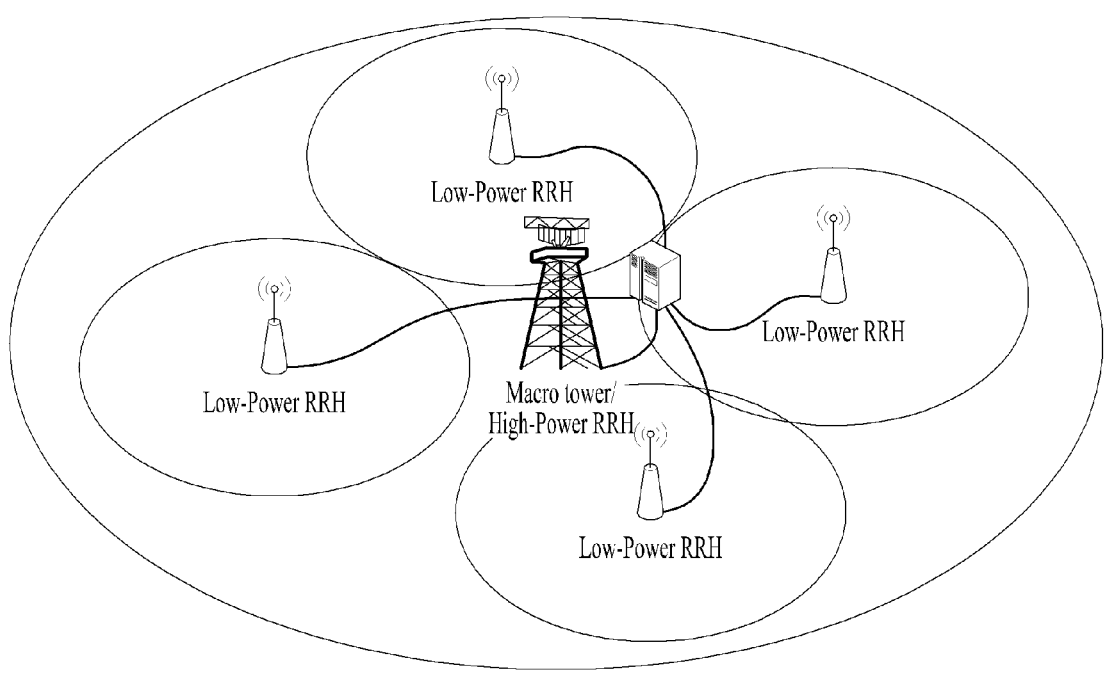
FIG. 10 is a view illustrating an exemplary wireless communication system to which the present invention is applicable.

FIG. 10 is a view illustrating an exemplary non-uniform network to which the present invention is applicable. As illustrated in FIG. 10, one macro node (or macro BS) may include a plurality of remote radio heads (RRHs). One or multiple physical antennas of one RRH may correspond to a portion of multiple physical antennas of one macro node. The plural RRHs are located in a geographically distributed form and may be connected to a common source through wired media such as fiber-optic cables. Accordingly, a delay in transmission and reception between the RRHs for serving through the RRHs may be insignificant such that the delay does not affect radio transmission and reception. Therefore, the plural RRHs may serve as one macro node.

Further, as illustrated in FIG. 10, a portion of the RRHs (or physical antennas of the macro node) may support higher-power transmission (i.e. wide coverage) and may be arranged at the center of a macro cell. Another portion of the RRHs may support low-power transmission (i.e. narrow coverage) and may be arranged out of the center of the macro cell. Multi-user separation may be supported by such a non-uniform network including geographically distributed antennas. For example, in the example of FIG. 10, if there is no mutual interference or mutual interference is negligible by sufficiently separating the low-power RRHs, the same time/frequency resource may be allocated to different UEs. For instance, the plural RRHs may cooperatively serve one UE (similar to CoMP JT) or the most appropriate one RRH may serve one UE (similar to CoMP DCS). Such an RRH-based MU-MIMO operation is advantageous in that multiple users can be served with low power in terms of the overall system.

In such a non-uniform network, determination as to through which RRH(s) a UE should be served may be performed based on a channel state for each RRH measured by the UE. If a UE is served through an RRH, a channel state of which is poor with respect to the UE, a non-uniform network operation may provide low system performance relative to an existing macro cell operation. Accordingly, to correctly support the non-uniform network operation, it is necessary correctly and efficiently feedback CSI for each RRH.

While the non-uniform network including a plurality of RRHs has been exemplarily described with reference to FIG. 10, the above description may be identically applied even to a network including a plurality of TPs in a similar way. For example, each of plural cells participating in a CoMP operation may correspond to a TP and, for smooth CoMP operation, CSI for each TP needs to be correctly and efficiently fed back.

Thus, the present invention can be applied to various multi-antenna systems and will now be described under the assumption of a multi-antenna network including plural TPs. Specifically, in a multi-antenna system including the plural TPs, one TP may correspond to one or more antenna ports and the plural TPs may belong to one cell or separate cells. For example, the plural TPs may have the same cell ID (e.g. in the case of a non-uniform network including plural RRHs or in the case in which plural TPs correspond to plural antenna ports of one cell) or may have separate cell IDs (e.g. in the case in which plural TPs (or cells) cooperatively perform CoMP operation). The above-described system will be referred to simply as a multi-antenna system (or multi-antenna network), the meaning of which includes the above application examples.

Hereinafter, a CSI feedback method for multiple antennas in the multi-antenna system and specific examples of the present invention supporting an RS for channel measurement will be described.

CSI Feedback in Multi-Antenna System

Downlink channel measurement may be performed under the assumption of downlink data transmission (or PDSCH transmission) and different CSI feedback operations may be defined according to the assumption whether a PDSCH is transmitted by one TP or by cooperation among plural TPs.

As a first method, CSI feedback under the assumption that all UE-configured TP(s) are used for PDSCH transmission is described. For example, this method may be understood as a CSI feedback method when one or more TPs cooperatively perform PDSCH transmission to a UE in a manner similar to CoMP JT.

In this case, as defined in legacy LTE release-10, at least one of 'one non-zero power CSI-RS configuration' and 'one or more zero power CSI-RS configurations' may be allocated to the UE. CSI-RS configurations may be distinguished by at least one of a CSI-RS transmission timing (i.e. period and offset), a CSI-RS arrangement RE pattern (e.g. any one of FIGS. 8(*a*) to 8(*e*)), and an RS sequence of a CSI-RS. For example, if two CSI-RS configurations are mapped to different locations in an RB pair even though they have the same CSI-RS transmission timing and sequence, they may be understood as different CSI-RS configurations. The UE may receive a CSI-RS according to a CSI-RS configuration allocated thereto, perform channel measurement based on the CSI-RS, and feed back the result of channel measurement (i.e. CSI) to a BS.

Assuming that one or more TPs cooperatively perform PDSCH transmission, each TP may correspond to an antenna port set (i.e. one or more antenna ports). That is, the UE may recognize the TP as an antenna port set. In addition, the UE may operate to perform CSI feedback based on a distinguished CSI-RS configuration, without recognizing which TPs (or antenna port sets) perform cooperative transmission or how many TPs perform cooperative transmission. Namely, the UE transparently recognizes the presence of the TP in terms of CSI feedback and a UE-configured antenna port (or antenna port set) and a distinguished CSI-RS configuration may be meaningful.

Meanwhile, an antenna selection based codebook structure may be used in order to obtain gain of TP selection. However, in a legacy wireless communication system, a total number of antenna ports for downlink transmission is restricted. For example, in a 3GPP LTE release-10 system, the number of antenna ports for downlink transmission is restricted to 1, 2, 4, or 8 and downlink transmission through 3, 5, 6, or 7 antenna ports cannot be supported unless a new downlink MIMO transmission scheme is defined. Due to such restrictions, when multiple TPs perform cooperative transmission, spatial resources (i.e. antenna ports) cannot be sufficiently used. For example, we may assume that the UE is located between two TPs, a first TP includes four antenna ports, and a second TP includes two antenna ports. In this case, although a maximum number of antenna ports capable of being used for downlink transmission is 6, the BS can configure only 1, 2, or 4 antenna ports for the UE if MIMO transmission using the 6 antenna ports is not defined.

In this way, in the case in which CSI feedback for all UE-configured TPs (or for CSI-RS configurations corresponding to all TPs) is performed, if the number of TPs performing cooperative transmission to the UE increases, the number of antenna port sets or the number of CSI-RS configurations through which CSI feedback should be performed increases and thus CSI feedback overhead of the UE increases. Hereinafter, a method for reducing CSI feedback overhead will be described.

As a second method, CSI feedback may be performed under the assumption that, among one or more UE-configured TPs, one or more UE-selected TPs (i.e. TP subsets) are used for PDSCH transmission. At this time, an indicator indicating which TPs the UE selects should be additionally fed back. However, since CSI feedback is performed with respect to only a portion of the UE-configured TPs, feedback overhead may be reduced compared with the first method. The indicator regarding TP selection may mean an indicator about antenna port set selection or an indicator for CSI-RS configuration selection.

As a third method, CSI feedback may be performed under the assumption that, among one or more UE-configured TPs, one TP subset is used for PDSCH transmission. The fact that one TP subset among plural TPs performs PDSCH transmission may be understood as an operation similar to a CoMP DCS operation. In this case, the BS may dynamically allocate or switch a TP (or TP subset) performing PDSCH transmission to the UE.

A plurality of TPs may be semi-statically allocated to the UE and the UE may report CSI regarding the plural semi-statically allocated TPs (or a plurality of antenna sets or a plurality of CSI-RS configurations). The BS may change a TP (or TP set) for PDSCH transmission every prescribed time duration (e.g. one subframe), based on the CSI reported by the UE. Upon receiving a PDSCH, the UE may demodulate the PDSCH based on a precoded DMRS, without the need to recognize from which TPs (or antenna port sets) the PDSCH is transmitted. Accordingly dynamic TP switching is possible.

Then, the BS may more flexibly perform TP switching (i.e. without additional CSI) based on CSI regarding plural TPs that has been reported once. Such a third method increases the amount of information of CSI feedback reported by the UE compared with the above-described methods but results in reduction of feedback overhead because the frequency of feedback transmission is reduced.

Measurement Object Designation

For channel measurement using a CSI-RS, the BS may indicate a CSI-RS used for measurement to the UE through UE-specific signaling. That is, the BS may indicate for which antenna port set (i.e. one or more antenna ports) channel measurement is to be performed by the UE based on a CSI-RS or indicate for which CSI-RS configuration set (i.e. one or more CSI-RS configurations) channel measurement is to be performed based on a CSI-RS. Here, the CSI-RS configuration may be a non-zero power CSI-RS configuration and/or a zero power CSI-RS configuration.

For example, one or more CSI-RS antenna port sets (or CSI-RS configuration sets) may be configured or designated for the UE by a higher layer (e.g. through higher layer signaling (e.g. RRC signaling)). This may be referred to as a basic CSI-RS antenna port set or basic CSI-RS configuration set.

The UE may perform channel measurement based on CSI-RSs corresponding to a portion or all of the basic antenna port set (or basic CSI-RS configuration set) designated through RRC signaling and feed back CSI. Alternatively, the UE may perform channel measurement based on CSI-RSs corresponding to an antenna port set (or CSI-RS configuration set), which is different from the basic antenna port set (or basic CSI-RS configuration set) designated through RRC signaling, and feed back CSI.

Separately from the above-described basic antenna port set (or basic CSI-RS configuration set), the BS may dynamically designate an antenna port set (or CSI-RS configuration set) for measurement of the UE. For this, the BS may transmit control information for designating the antenna port set (or CSI-RS configuration set) for measurement through a downlink control channel. For example, the control information may be transmitted through a PDCCH or may be transmitted through a PDSCH by being included in a MAC protocol data unit (PDU) as a control element.

As a first example, a 'CST request field' of one or two bits included in an uplink DCI format (i.e. DCI format 0 or 4) may be used as an indication bit for designating an antenna port set (or CSI-RS configuration set) for measurement. If a 2-bit CSI request field is used, 4 different antenna port sets (or CSI-RS configuration sets) may be indicated.

As a detailed example, antenna ports A0 to A7 may be allocated to the UE as a basic CSI-RS antenna port set by a higher layer (e.g. through RRC signaling). In this case, for which antenna port the UE is to perform channel measurement based on a CSI-RS may be determined based on a value of measurement object indication information (e.g. CSI request field included in an uplink DCI format). In this case, a mapping relationship between the value of the CSI request field and the antenna ports A0 to A7 may be predetermined through the above RRC signaling or additional RRC signaling. That is, upon receiving receiving the CSI request field, based on information about a basic antenna port allocated to the UE and the mapping relationship between the basic antenna port and the value of the CSI request field, the UE may determine antenna ports (or antenna port set) corresponding to CSI-RSs on which channel measurement to be performed is based. If the antenna ports A0 to A7 are allocated as basic antenna ports to the UE by RRC signaling, the mapping relationship between the basic antenna ports and the measurement object indication information (e.g. CSI request field) is exemplarily shown below in Table 4.

TABLE 4

| Mapping Type | Measurement object indication information | Measurement object antenna port |
|---|---|---|
| 1 | 00 | A0 |
|   | 01 | A1 |
|   | 10 | A2 |
|   | 11 | A3 |
| 2 | 00 | A4 |
|   | 01 | A5 |
|   | 10 | A6 |
|   | 11 | A7 |
| 3 | 00 | A0 and A1 |
|   | 01 | A2 and A3 |
|   | 10 | A4 and A5 |
|   | 11 | A6 and A7 |
| 4 | 00 | A0 and A1 |
|   | 01 | A2 and A3 |
|   | 10 | A0, A1, A2, and A3 |
|   | 11 | A4, A5, A6, and A7 |

The mapping relationship between the value of the measurement object indication information (e.g. CSI request field) and the measurement object antenna port is not restricted to the above Table 4 and may be defined according to various schemes. Although Table 4 may be understood as an example in which the measurement object indication information indicates a portion or all of the basic antenna ports as described above, Table 4 may be understood as an example of measurement object antenna ports to which the measurement object indication information is mapped (i.e. independently) irrespective of the basic antenna port.

In addition, the example of the aforementioned measurement object antenna port according to the present invention may be equally understood as the example of the measurement object CSI-RS configuration. For example, if CSI-RS configurations C1, C2, C3, and C4 are allocated to the UE by RRC signaling, information about a mapping relationship between the allocated CSI-RS configurations and a CSI request bit of a DCI format may be provided by RRC signaling and the UE may determine CSI-RS configurations corresponding to CSI-RSs on which channel measurement to be performed is based, from the value of the CSI request bit.

While the above examples have been described focusing upon the case in which indication information of the antenna port set (or CSI-RS configuration set) of a measurement object is the CSI request field of the DCI format, other fields of the DCI format may be used. Here, the size of the measurement object indication information is not necessarily restricted to two bits or less and may be designated as a certain bit size. In some cases, 3-bit measurement object indication information may be defined. In this case, a specific field of the DCI format may be reused as the indication information or a rule of implicitly mapping a value of the specific field of the DCI format and a value of the indication information may be defined. Alternatively, a new DCI format may be defined in a form of adding the indication information to the existing DCI format.

In the above example, if the measurement object indication information (e.g. CSI request bit) is not received or the measurement object indication information is not valid, channel measurement may be performed with respect to a basic measurement object (e.g. a basic antenna port set or basic CSI-RS configuration set) configured by a higher layer and CSI determined by channel measurement may be fed back.

As a second example, for which antenna port set (or CSI-RS configuration set) CSI is fed back may be determined according to a channel type through which CSI is fed back. For example, in the case of CSI reported through the PUCCH, channel measurement may be performed based on a CSI-RS corresponding to an antenna port set (or CSI-RS configuration set) configured by the BS through RRC signaling and the CSI may be fed back. Meanwhile, in the case of CSI reported through a PUSCH, if the indication bit (e.g. a CSI request field of PDCCH DCI format 4) is not present, channel measurement may be performed based on a CSI-RS corresponding to an antenna port set (or CSI-RS configuration set) configured by the BS through RRC signaling and the CSI may be fed back. In this case, if the indication bit is provided, channel measurement may be performed based on a CSI-RS corresponding to an antenna port set (or CSI-RS configuration set) indicated by the indication bit and the CSI may be fed back.

Figure 11:
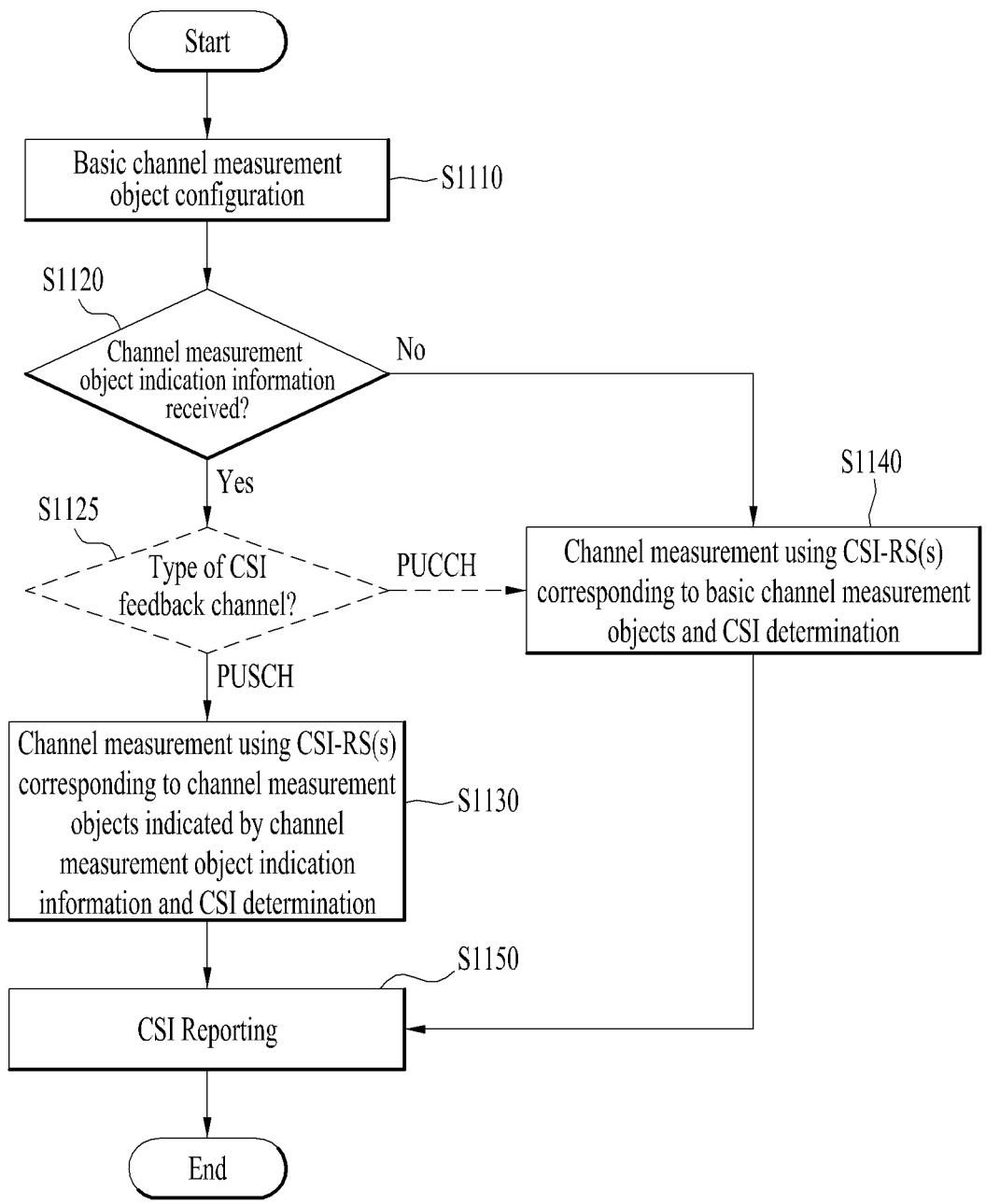
FIG. 11 is a flowchart explaining an exemplary CSI feedback method according to the present invention.

FIG. 11 is a flowchart explaining an exemplary CSI feedback method according to the present invention.

In step S1110, basic channel measurement objects for a UE may be configured. For example, the basic channel measurement objects for the UE may be configured by a higher layer (e.g. through RRC signaling). The channel measurement objects may be a TP set (i.e. one or plural TPs), an antenna port set (i.e. one or plural antenna ports), and/or a CSI-RS configuration set (i.e. one or plural CSI-RS configurations). In other words, an allocation unit of the channel measurement objects may be provided in the unit of a TP set, the unit of an antenna port set, and/or the unit of a CSI-RS configuration set.

In step S1120, a determination operation of the channel measurement object is differently performed depending on whether the UE receives channel measurement object indication information (e.g. a CSI request bit may be used) from the BS. Here, the channel measurement object indication information may indicate a portion or all of the basic channel measurement objects configured in step S1110. Alternatively, the channel measurement object indication information may indicate objects upon which the UE should perform channel measurement (i.e. the objects may correspond to or may not correspond to the basic channel measurement objects, or a portion of the objects may correspond to the basic channel measurement objects and the other portion of the objects may not correspond to the basic channel measurement objects), irrespective of the basic channel measurement object configured in step S1110.

In step S1120, if the UE receives the channel measurement object indication information, step S1130 may be performed. An example of omitting step S1125 and performing step S1130 (i.e. an example of not considering a channel type through which CSI is transmitted) will now be described first. In step S1130, the UE may perform channel measurement using a CSI-RS corresponding to channel measurement objects indicated by the channel measurement object indication information. Further, the UE may determine CSI (RI/PMI/CQI, etc.) based on the measured channel state.

If the UE receives the channel measurement object indication information in step S1120, determination as to a type of a channel through which CSI is to be transmitted may be additionally performed in step S1125. If a CSI feedback channel is a PUSCH (i.e. in the case of aperiodic CSI reporting), the aforementioned step S1130 may be performed. If the CSI feedback channel is a PUCCH (i.e. in the case of periodic CSI reporting), step S1140, which will be described later, may be performed.

Meanwhile, if the UE has not received the channel measurement object indication information in step S1120, step S1140 may be performed. In this case, step S1140 may be performed irrespective of the type of the CSI feedback channel (i.e. without a determination operation such as step S1125). In step S1140, the UE may perform channel measure using a CSI-RS corresponding to the basic channel measurement objects configured in step S1110. Further, the UE may determine CSI (RI/PMI/CQI, etc.) based on the measured channel state.

In step S1150, the UE may transmit the determined CSI to the BS.

In the CSI feedback method of the present invention described with reference to FIG. 11, the foregoing embodiments may be independently implemented or two or more of the embodiments may be simultaneously applied. For clarity, a repeated description will be omitted herein.

Figure 12:
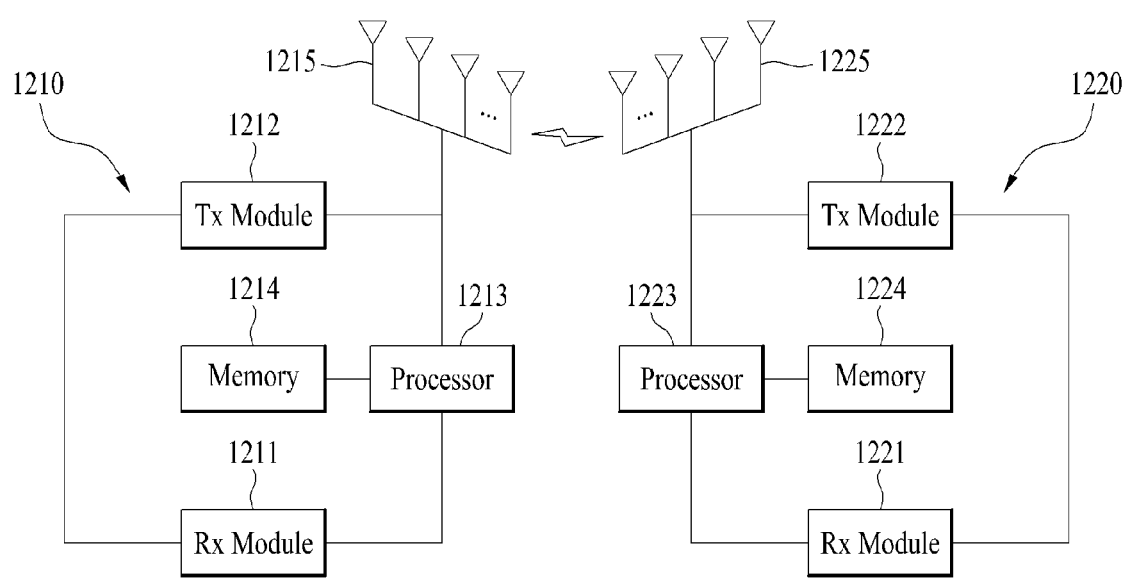
FIG. 12 is a block diagram of a UE and a BS according to an exemplary embodiment of the present invention.

FIG. 12 is a block diagram of a UE and a BS according to an exemplary embodiment of the present invention.

Referring to FIG. 12, a BS 1210 may include a reception (Rx) module 1211, a transmission (Tx) module 1212, a processor 1213, a memory 1214, and a plurality of antennas 1215. The BS 1210 supports MIMO transmission and reception through the plural antennas 1215. The Rx module 1211 may receive signals, data, and information on uplink from the UE. The Tx module 1212 may transmit signals, data, and information on downlink to the UE. The processor 1213 may control overall operation of the BS 1210.

The BS 1210 according to an embodiment of the present invention may be configured to receive CSI. The processor 1213 of the BS 1210 may be configured to transmit configuration information regarding a basic channel measurement object to the UE 1220 through the Tx module 1212. The processor 1213 may also be configured to transmit channel measurement object indication information to the UE 1220 through the Tx module 1212. The processor 1213 may also be configured to receive the CSI from the UE 1220 through the Rx module 1211. The CSI may be determined based on a channel state measured using a CSI-RS corresponding to a channel measurement object by the UE 1220.

The processor 1213 of the BS 1210 may process information received by the BS 1210 or information to be transmitted from the BS 1210. The memory 1214 may store processed information for a predetermined time and may be replaced with a component such as a buffer (not shown).

Referring to FIG. 12, a UE 1220 may include an Rx module 1221, a Tx module 1222, a processor 1223, a memory 1224, and a plurality of antennas 1225. The UE 1220 supports MIMO transmission and reception through the plural antennas 1225. The Rx module 1221 may receive signals, data, and information on downlink from the BS. The Tx module 1222 may transmit signals, data, and information on uplink to the BS. The processor 1223 may control overall operation of the UE 1220.

The UE 1220 according to an embodiment of the present invention may be configured to transmit CSI. The processor 1223 of the UE 1220 may be configured to receive configuration information regarding a basic channel measurement object from the BS 1210 through the Rx module 1221. The processor 1223 may also be configured to receive channel measurement object indication information from the BS 1210 through the Rx module 1221. The processor 1213 may also be configured to perform channel measurement using a CSI-RS corresponding to a channel measurement object. The processor 1223 may be configured to transmit the CSI to the BS 1210 through the Tx module 1222.

The processor 1223 of the UE 1220 may process information received by the UE 1220 or information to be transmitted from the UE 1220. The memory 1224 may store processed information for a predetermined time and may be replaced with a component such as a buffer (not shown).

The above UE and BS may be configured to implement the foregoing embodiments independently or implement two or more of the embodiments simultaneously. For clarity, a repeated description will be omitted herein.

The description of the BS 1210 in FIG. 12 may apply to a relay node as a downlink transmission entity or an uplink reception entity and the description of the UE 1220 in FIG. 12 may apply to the relay node as a downlink reception entity or an uplink transmission entity.

The above-described embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSP), digital signal processing devices (DSDPs), programmable logic devices (PLDs), field programmable gate arrays (FPGAs), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to limit the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described various embodiments of the present invention are applicable to various mobile communication systems.

The invention claimed is:

1. A method for transmitting channel state information (CSI) at a user equipment, the method comprising:
   receiving, by the user equipment, configuration information about first channel measurement objects from a base station;
   obtaining, by the user equipment, channel measurement object indication information indicating second channel measurement objects from the base station when the user equipment receives the second channel measurement objects;
   generating, by the user equipment, the CSI by performing channel measurement using CSI-reference signals (CSI-RSs) corresponding to the first channel measurement objects or the second channel measurement objects; and
   transmitting, by the user equipment, the CSI to the base station,
   wherein the generating the CSI by performing the channel measurement comprises:
      when the user equipment does not receive the second channel measurement objects, generating the CSI by performing channel measurement using the CSI-RSs corresponding to the first channel measurement objects; and
      when the user equipment receives the second channel measurement objects, generating the CSI by performing channel measurement using the CSI-RSs corresponding to the first channel measurement objects or the second channel measurement objects,
   wherein the first channel measurement objects and the second channel measurement objects are a CSI-RS configuration set.

2. The method according to claim 1, wherein the channel measurement object indication information indicates one or more among the first channel measurement objects or indicates the second channel measurement objects independent of the first channel measurement objects.

3. The method according to claim 1, wherein if the channel measurement object indication information is not received, the channel measurement is performed using CSI-RSs corresponding to the first channel measurement objects.

4. The method according to claim 1, further comprising:
   when the user equipment receives the second channel measurement objects, determining a type of a CSI feedback channel,
   wherein, when the user equipment receives the second channel measurement objects and the CSI feedback channel is a physical uplink control channel (PUCCH), the channel measurement is performed using CSI-RSs corresponding to the first channel measurement objects.

5. The method according to claim 1, further comprising:
when the user equipment receives the second channel measurement objects, determining a type of a CSI feedback channel,
wherein, when the user equipment receives the second channel measurement objects and the CSI feedback channel is a physical uplink shared channel (PUSCH), the channel measurement is performed using the CSI-RSs corresponding to the second channel measurement objects.

6. The method according to claim 1, wherein the first channel measurement objects are configured by a higher layer.

7. The method according to claim 1, wherein the channel measurement object indication information is received through a physical downlink control channel (PDCCH).

8. The method according to claim 1, wherein the channel measurement object indication information is indicated using a CSI request bit.

9. A method for receiving channel state information (CSI) at a base station, the method comprising:
transmitting, by the base station, configuration information about first channel measurement objects to a user equipment;
determining, by the base station, whether channel measurement object indication information indicating second channel measurement objects to the user equipment is transmitted; and
receiving, by the base station, the CSI from the user equipment,
wherein the CSI is generated based on a channel state measured by the user equipment using CSI-reference signals (CSI-RSs) corresponding to the first channel measurement objects or the second channel measurement objects,
wherein, when the base station does not transmit the second channel measurement objects, the CSI is generated by performing the channel measurement using the CSI-RSs corresponding to the first channel measurement objects,
wherein, when the base station transmits the second channel measurement objects, the CSI is generated by performing the channel measurement using the CSI-RSs corresponding to the first channel measurement objects or the second channel measurement objects, and
wherein the first channel measurement objects and the second channel measurement objects are a CSI-RS configuration set.

10. A user equipment for transmitting channel state information (CSI), the user equipment comprising:
a receiver configured to receive a downlink signal from a base station;
a transmitter configured to transmit an uplink signal to the base station; and
a processor configured to control the user equipment including the receiver and the transmitter,
wherein the processor is further configured to:
receive configuration information about first channel measurement objects from the base station through the receiver;
obtain channel measurement object indication information indicating second channel measurement objects from the base station through the receiver when the receiver receives the second channel measurement objects;
generate the CSI by performing channel measurement using CSI-reference signals (CSI-RSs) corresponding to first channel measurement objects or the second channel measurement objects; and
transmit the CSI to the base station through the transmitter,
wherein, when the receiver does not receive the second channel measurement objects, the processor generates the CSI by performing the channel measurement using CSI-RSs corresponding to the first channel measurement objects,
wherein, when the receiver receives the second channel measurement objects, the processor generates the CSI by performing the channel measurement using CSI-RSs corresponding to the first channel measurement objects or the second channel measurement objects, and
wherein the first channel measurement objects and the second channel measurement objects are at a CSI-RS configuration set.

11. A base station for receiving channel state information (CSI), the base station comprising:
a receiver configured to receive an uplink signal from a user equipment;
a transmitter configured to transmit a downlink signal to the user equipment; and
a processor configured to control the base station including the receiver and the transmitter,
wherein the processor is further configured to:
transmit configuration information about first channel measurement objects to the user equipment through the transmitter;
determine whether channel measurement object indication information indicating second channel measurement objects is transmitted to the user equipment through the transmitter; and
receive the CSI from the user equipment through the receiver, and
wherein the CSI is generated based on a channel state measured by the user equipment using CSI-reference signals (CSI-RSs) corresponding to the first channel measurement objects or the second channel measurement objects,
wherein, when the base station does not transmit the second channel measurement objects, the processor generates the CSI by performing channel measurement using the CSI-RSs corresponding to the first channel measurement objects,
wherein, when the base station transmits the second channel measurement objects, the processor generates the CSI by performing the channel measurement using the CSI-RSs corresponding to the first channel measurement objects or the second channel measurement objects, and
wherein the first channel measurement objects and the second channel measurement objects are a CSI-RS configuration set.

* * * * *